United States Patent [19]
Bullis

[11] Patent Number: 5,966,169
[45] Date of Patent: Oct. 12, 1999

[54] THREE DIMENSIONAL BEAMFORMED TELEVISION

[76] Inventor: James K. Bullis, 1155 Pimento Ave., Sunnyvale, Calif. 94087

[21] Appl. No.: 08/828,816

[22] Filed: Mar. 15, 1997

[51] Int. Cl.$^6$ ..................................................... H04N 7/18
[52] U.S. Cl. .............................. 348/81; 348/82; 367/103; 367/104
[58] Field of Search ........................... 348/81, 82; 367/7, 367/11, 103, 104, 105, 88, 153, 173; 128/660.03, 660.07, 662.03, 663.09, 661.01; 73/623, 625, 603

[56] References Cited

U.S. PATENT DOCUMENTS

| | | | |
|---|---|---|---|
| 4,745,584 | 5/1988 | Andersen | 367/173 |
| 5,134,884 | 8/1992 | Anderson | 73/625 |
| 5,163,026 | 11/1992 | Peynaud | 367/104 |
| 5,172,343 | 12/1992 | O'Donnell | 367/7 |
| 5,192,978 | 3/1993 | Keeler | 348/81 |
| 5,200,931 | 4/1993 | Kosalos et al. | 367/11 |
| 5,249,046 | 9/1993 | Ulich et al. | 348/81 |
| 5,305,135 | 4/1994 | Chovan | 359/202 |
| 5,485,842 | 1/1996 | Quistgaard | 128/660.07 |
| 5,501,655 | 3/1996 | Rolt et al. | 128/660.03 |
| 5,522,393 | 6/1996 | Phillips et al. | 128/660.07 |
| 5,601,083 | 2/1997 | Anderson | 128/660.07 |
| 5,678,554 | 10/1997 | Hossack et al. | 128/662.03 |
| 5,787,049 | 7/1998 | Bates | 367/7 |

Primary Examiner—Anand S. Rao

[57] ABSTRACT

The system provides three-dimensional real time imaging, with features that serve to control acoustic effects that cause interference. Systems are disclosed for medical imaging and other applications in fields that utilize radiated wave signals. The system includes visualization methods to enable guidance of surgical instruments as well as general medical diagnostic usage. The present invention uses a beamformed television method which achieves visual format imaging. Beamformed television includes orthogonal arrays to efficiently resolve two dimensions of a scene with measures to control grating lobes. Beamformed television also includes a method that reduces the time to transmit and receive signals by use of a single burst transmission of multiple frequency codes from each transducer which causes multiple, coded transmit beams that are radiated simultaneously. The addition of step chirp operations achieves highly precise range resolution which makes visual format imaging possible at selected ranges. It also enables a variety of visualization capabilities. The step chirp operation involves repeating the burst transmission at sequentially stepped frequencies. Thus, the frequency codes, that enable the transmit beamforming process, are shifted as a group for each frequency step of the stepped chirp. Frequency domain to time domain conversion using an FFT method efficiently yields range resolved signals.

50 Claims, 13 Drawing Sheets

THREE DIMENSIONAL BEAMFORMED TELEVISION

BACKGROUND OF THE INVENTION

1. Field of the Invention

The invention relates to creating images by transmitting signals and sensing the effect of objects in the field of view on the signals.

2. Description of the Prior Art

The beamformed television method of U.S. Pat. No. 5,598,206 (January 1997) Bullis provided an underwater viewing system to display images sensed by a remotely operating part of the apparatus. This prior system was designed to operate as much like the popular video television camera as possible. This resulted in a system to determine scattering information in two angular dimensions and to form a picture from this information. This process was done at a repetition rate such that motion picture effects were achieved. This beamformed television system is very different from the usual conventional sonar where only one angular dimension is determined.

Beamforming is a signal processing operation applied in respect to arrays of acoustic transducers. Other types of transducers such as antennas can also be used. Receive beamforming is used to selectively receive propagating wave signals according to their angle of arrival. A receive beam can be electronically steered to change the direction from which to receive. Simultaneous receive beamforming means that there are multiple channels that selectively respond so as to receive propagating wave signals according to their respective angles of arrival. The response of these multiple channels is obtained by processing a single set of signals from the receiving transducers in the array. Transmit beamforming is used to control the direction of radiation relative to the transmitting array. It can also be electronically steered. Simultaneous transmit beamforming means that beams are emanated in multiple directions at the same time. To make this effective a coding system must be used to distinguish between the multiple transmit beams. Each such code is associated with a respective transmit beam direction. Use of these transmit beams requires that the codes be recognized and sorted after the reflected signals have been received. Where such simultaneous methods are used, the process of sequentially scanning through all the required directions is eliminated.

A visual like image can be generated if the locations of reflecting points in a field of view can be determined in two angular dimensions. Such reflecting point positions correspond, respectively, to an electronic memory location, or channel. The image data includes the strength of these reflections as a number stored in such a memory location. Such locations of reflecting points can be associated with respective pixels on a display device. Such pixels have positions on a display screen that are measured in the coordinates of the display screen. An effective imaging process is to associate the horizontal coordinate, or dimension, with one of the two angular dimensions and to associate the vertical coordinate, or dimension, with the other of the two angular dimensions. The strengths of the respective reflections are then electronically plotted on the screen. The brightness of such plotted points represents the strength of the reflection from that point. This is the way optical systems such as television systems generally work. It is also the way the human eye works.

In U.S. Pat. No. 5,598,206 (January 1997) Bullis, disclosed systems were built around a concept of orthogonal linear arrays and simultaneous beamforming techniques. Such systems are attractive for determining such positions in angular dimensions. Herein, a large number of transmitting elements were arranged in a line and a large number of receiving elements were arranged in a perpendicular line. The array beamforming operations involved simultaneous transmit beamforming and simultaneous receive beamforming so that previously mentioned rapid coverage of the field of view was accomplished. This coverage was accomplished in the time interval required for a single burst transmission and a single round trip propagation interval.

The two dimensional angular locations of all reflecting points can be determined by a combination of the transmit beamforming system and the receive beamforming system. A number, N, of transmit beams are formed in the system. For each of these transmit beams, a number, M, of receive beams are formed. This results in N×M channels. The amplitude of the signal in each such channel represents the strength of reflection from the region where the beams overlap. The result is the image data that drives N×M pixels according to the associated reflection strength. The elements in both arrays must be appropriately arranged and the two arrays must be appropriately oriented so as to provide a complete, unambiguous set of such image data. Such system configurations must be designed to be practical and economical in the particular application.

The prior patent U.S. Pat. No. 5,598,206 (January 1997) Bullis addressed underwater imaging and also referred to radar, and medical imaging applications as other possible applications. Reference was made to general application possibilities which arise where other forms of radiating wave signals are available. Systems built around the concept of orthogonal linear arrays were found to be attractive. A large number of transmitting elements were arranged in a line and a large number of receiving elements were arranged in a perpendicular line. The use of both simultaneous transmit beamforming and simultaneous receive beamforming showed great promise because complete coverage of the field of view was accomplished as a result of a single burst transmission, thus achieving a nearly instantaneous scan over two dimensions. A number of important distinguishing features were necessary to make these basic concepts into an effective system.

In addition to underwater imaging use, applications to medical ultrasound imaging are especially interesting. In this field, state of the art linear array systems exist that use a single array for both transmitting and receiving. A single transmit beam is formed in a direction and a single receive beam is formed in that same direction to receive the reflections from the transmit beam. The angle dimension of the resulting picture is simply the angle of the beam. The range dimension of the resulting picture is obtained from the arrival time of a reflected signal. This process is repeated sequentially to accomplish scanning of the object of examination. This complete scan can be done rapidly to enable a full frame to be obtained and displayed in a short time. Repetition of this frame provides motion picture like effects. However, the display is range versus angle so the format is not consistent with normal way things are seen by the human eye. This is a very different type of display than that discussed in U.S. Pat. No. 5,598,206 (January 1997) Bullis which would provide an elevation angle versus azimuth angle display to enable a more visual like image presentation.

A direct application of U.S. Pat. No. 5,598,206 (January 1997) Bullis to medical ultrasound imaging has been examined. Such a direct application would allow the viewer to see into the human body but the many intervening layers will all show as overlays of each other. It is important to be able to discriminate. Therefore the range resolution issue becomes significant. In U.S. Pat. No. 5,598,206 (January 1997) Bullis, methods to selectively view range zones based on depth of field effects in the near field were disclosed. This method of selectivity is not as precise as desired in some circumstances. Range resolution inherent in the properties of waveforms used for coding was also disclosed in U.S. Pat. No. 5,598,206 (January 1997) Bullis. Codes discussed were simple, single frequency pulses but other codes were indicated as an option. Codes such as pseudo random noise (PRN) are well known codes to use for improving range resolution in radar and sonar. Use of such codes will give range resolution inherent to the code properties as a result of code channel formation as disclosed. Such codes provide full resolution of the range dimension and this enables selective range zone viewing. However, use of codes to give fine grain range resolution leads to a difficult trade off between processing time and range resolution. Where the range resolution is small, the appropriate method for beamforming is a time delay method. Time delay methods are very desirable except that they require lengthy signal processing operations. Because of this, the methods in U.S. Pat. No. 5,598,206 (January 1997) Bullis have practical drawbacks.

Not all internal parts of the human body are stationary. Sensing motion is an important capability in medical ultrasound systems. The invention U.S. Pat. No. 5,598,206 (January 1997) Bullis provided for selectively viewing moving scattering centers. The resulting image signals enabled viewing of an image representing all particles having a particular radial velocity. However, this invention fails to make a full field of view image of the radial velocity of the individual scattering centers.

From another field, there are commercial laboratory instruments that use a stepped-chirp signal with FFT (fast Fourier Transform) processing to resolve the time dimension. An example is the Hewlett Packard 8510 Network Analyzer family of instruments. There are also laboratory instruments that use a gated-tone method to resolve the time dimension. Flam and Russel Co. produced such a product as did Scientific Atlanta Co. In the field of radar cross section measurement it is known to use such instruments in combination to measure low level signals. In some cases radar cross section imaging systems have been assembled which produce images having dimensions of range and cross range. Such systems used controlled target rotation and synthetic aperture processing to resolve the cross range dimension. Such systems did not use of transducer array methods to resolve the angular dimensions. They did not produce visual like images.

In still another field there are known sonars that utilize continuous transmission frequency modulation to determine range to targets by frequency of an audible tone.

The invention U.S. Pat. No. 5,598,206 (January 1997) Bullis provided for basic features to yield acceptable image quality. These included disclosure of a special linearity requirement in the transmitting system such that times when the transducer output saturates are infrequent. Allowing occasional saturation adds to the clutter in the image.

The following list of objects and advantages will make apparent the benefits of a very efficient, full three dimensional system having fine grain resolution in all three dimensions.

The patents referenced in this document are incorporated by reference. In case of conflict, the present document takes precedence in all respects.

OBJECTS AND ADVANTAGES

A general object of the present invention is to produce three dimensional image information that can be rapidly processed to enable complete perception of the three dimensional block of information. Another general object is to provide imaging over the dimension of velocity.

An object of this present invention is to provide a complete three dimensional imaging system for medical ultrasound imaging in human or other living bodies, with a degree of perception that will greatly enhance the role of ultrasound imaging in medical diagnostics and will support intricate surgical procedures using remotely controlled instruments.

An object is to provide a research tool to investigate the scattering levels of various types of human tissue.

An object of this present invention is to enable imaging with low acoustic power levels to prevent damage to the subject of examination.

An object of the present invention is to image the velocity field of moving particles in bodies.

An object of this present invention is to provide a complete three dimensional imaging system for underwater exploration or other underwater operations.

An object of this present invention is to provide a ground penetrating radar system that has sufficient resolution to distinguish between objects of interest and natural objects.

An object of this present invention is to provide an air acoustic imaging system, with optional capability to penetrate the ground to search for articles of interest.

An object of this present invention is to enable high speed operations such that real time operations are enabled.

An object of the three dimensional beamformed television system is to efficiently achieve high resolution over a useful three dimensional field of view. An advantage is the speed of processing that comes from a system that utilizes FFT rather than time delay methods.

An object of the three dimensional television system is to produce sharply focused images over an extended field of view in a single extended exposure operation. An advantage is a beam segment coding system that is based on the two dimensions of range and angle where focusing is achieved over selected beam segments.

Further objects and advantages of the present invention will become apparent from a consideration of the drawings and ensuing description.

SUMMARY OF THE INVENTION

A system has been invented that provides full field of view, fine grain, three dimensional real time, ultrasound imaging of the internals of the human body with capability of Doppler processing to enable imaging that describes the motions within the body. For each pixel that is located in the conventional three spatial dimensions, the velocity distribution for particles in that pixel can be displayed.

The present invention is a combination of the prior invention, U.S. Pat. No. 5,598,206 (January 1997) Bullis, and a new system that provides fine grain range resolution. It also includes a feature that provides radial velocity imaging. Additional features important in system implementation include means to further control and suppress acoustic effects that cause artifacts or general interference in the image.

The present invention is described herein in terms related to medical ultrasound imaging, but important applications also exist in underwater imaging, radar imaging, and other fields that utilize radiating wave energy.

In medical ultrasound imaging it is very important to see through various body layers in order to view the objective body part. These intervening layers show up as overlays on the intended layer. The present invention makes it possible to exclude layers that are not the subject of examination at a particular time, essentially creating an effect of invisibility. This is done by selectively setting image data signal strength values to zero, thereby causing the invisibility.

The present invention provides sharply resolved three dimensional detail of the object of examination. This achieves clarity and sensitivity.

The invention enables the capability to guide a surgical instrument with great precision over a three dimensional path within the human body. This can be very effectively done using a real time display that shows all the critical organs as well as the instrument moving among such organs. Surgical dexterity is greatly enhanced by the invention that provides the view that is normally the mode of human vision. This is an elevation versus azimuth angle display. The present invention makes available the full three dimensional data set which enables image processing that creates an elevation versus azimuth view from arbitrary perspectives. To view the critical organs from several directions as the surgical instrument is moved would avoid damaging such critical organs.

The capability to view and evaluate moving internal body parts, such as the heart, is also an important feature of the present invention. The capability to view blood flowing is dependent on the level of scattering in the blood, but this capability can be explored with this new tool. The capability to measure velocity over the complete image field also exists in the present invention. This measurement is done using Doppler bins which are another dimension of imaging resolution, hence more pixels.

This three dimensional system with Doppler resolution capability, is made possible by the time saving methods of the prior invention U.S. Pat. No. 5,598,206 (January 1997) Bullis for completely resolving two angular dimensions of a scene as a result of a single burst transmission. The combination of this efficient prior method with another efficient method for highly precise range resolution results in a full three dimensional, real time, imaging system. Other distinguishing features are appropriate to maintain image quality.

Efficient resolution of the range dimension is achieved by inclusion of a stepped-chirp process. This stepped-chirp method includes processing that transforms from the frequency domain to the time domain to give the time scale that is directly converted to the range scale. This range resolving process is accomplished by repeating the two dimensional imaging process a number of times with successive repetitions being done at sequentially stepped frequency. Since the two dimensional imaging process uses multiple frequency codes to enable the high speed transmit beamforming process, this entire set of frequency codes is shifted in frequency as a whole, for each step of frequency shift. For each azimuth-elevation pixel there is a set of complex data points each of which gives amplitude and phase of the particular frequency tone used for that step. The conversion to the time domain using FFT (fast Fourier transform) methods gives the amplitude of the reflections as a function of time for each azimuth-elevation pixel.

A special adjustment must be made to the two dimensional beamforming process to compensate for variation of beam angles as frequency is shifted over a significant bandwidth. The grating lobe control provisions of U.S. Pat. No. 5,598,206 (January 1997) Bullis are also required since this compensation also aligns grating lobes. Control of depth of field must be maintained so the beam segment coding system of that prior invention is also applicable to give an extended depth of field relative to that which occurs from a single fixed focus zone.

The entire exposure process is rapidly accomplished because of the instantaneous array scanning processes. The efficiency of the FFT (fast Fourier Transform) methods makes it possible to efficiently and economically carry out the processing. Real time operation is achieved, where real time means that the operator can observe the results on a continuous basis during an examination.

Another significant feature is a method to quantitatively perceive the motions of internal body parts such that an image of the radial velocity content can be constructed over the full field of view.

The capability to view, over the full field of view, the Doppler shifted signals is achieved by separating the transmit beamforming code frequencies (tones) so that there is space for Doppler shifted signals to fall in between the adjacent beamforming frequency codes. These can then be selected for range resolution processing by choosing all bins that are the same separation from the nominal frequency for that transmit beam. Signal level in all beams can be displayed by activating a separate color for each Doppler bin. The resulting color display will contain the unique associated color, or a new color that is the blend of colors caused by signal presence in more than one bin, for a particular three dimensional location. This results in a set of data from which selections must be made in order to operate within the limits of ordinary color monitors. The available data block to draw from is a four dimensional matrix of complex numbers.

An important enabling feature is included that allows the process of transmitting and receiving of long duration signals where such operation causes dynamic range problems. This is important for the range resolution method and, even more so, is important for the capability to resolve Doppler effects. This involves a gated-tone method which is a process of interrupting the transmitted tone and selectively activating the receiver so as to operate like a pulsed system yet maintain a continuous coherent reference.

The present invention also provides for additional measures to enhance quality of images by use of acoustic path control surfaces. These include a system of rails that are attached to the arrays, parallel to the long dimension of each array. These are along both sides of each array. By appropriate choice of rail angle much of the grating lobe energy is redirected to enhance the main beam direction, but the benefits of the notch in the directivity pattern, that is caused by use of multiple elements in the narrow array direction, are retained. These also include planar or shaped surfaces to redirect or absorb acoustic energy as required for the application.

A means of acoustic radiation (transmission and reception) pattern control for individual transducers is included. This involves use of tapered impedance matching layers, absorbing materials, and blocking screens such that the effective aperture of individual transducers is shaded or modified.

Other measures provided in the present invention include corrections to be applied to transmit signals to suppress effects of high amplitude peaks in the combined signals that drive the transducers. Rather than allow saturation and the associated effects, the signal generation process includes a short scale adjustment to minimize effective signal loss. This enhances signal to clutter ratio.

A visualization system is an additional feature such that the four dimensional volume of data supports surgical operations in real time. It provides visualization of the critical zone of the activity as if viewed from an arbitrary perspective. From a selected point in space vectors are projected into the three dimensional image data to select the bins to present on the screen.

Variations on the three dimensional television include a range of applications and a variety of signal organization and processing methods.

DESCRIPTION OF THE PREFERRED EMBODIMENT

The preferred embodiment will here be described. This description is for a particular implementation which is an illustration of a presently preferred embodiment. Variations are also discussed in reference to the preferred embodiment. Other embodiments are disclosed in a later section. The scope of the invention should be determined by the appended claims and their legal equivalents and not by the example given.

This disclosure is written in terminology for the system design engineer who is knowledgeable in a wide range of disciplines within the general electronic and physics professions. A variety of specialists is typically required to produce the detailed hardware, depending on the application.

DRAWINGS

Figure 1:
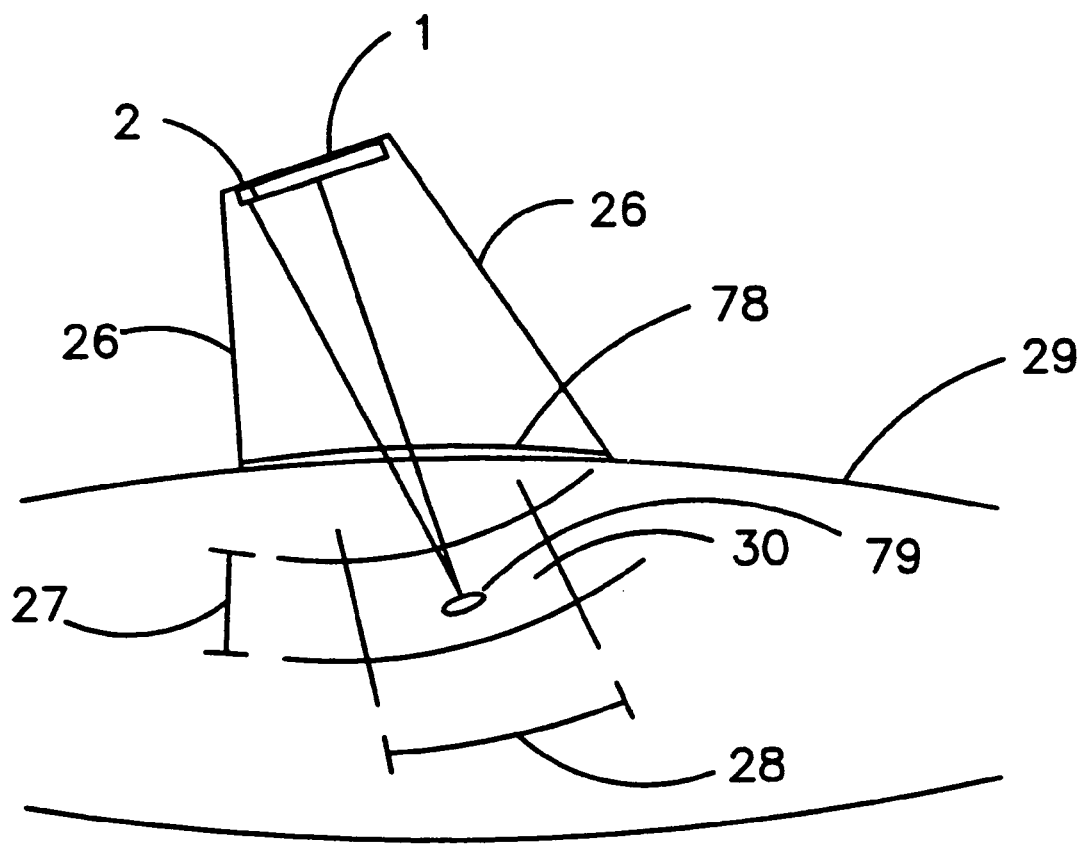

FIG. 1—a medical imaging system application.

Figure 2:
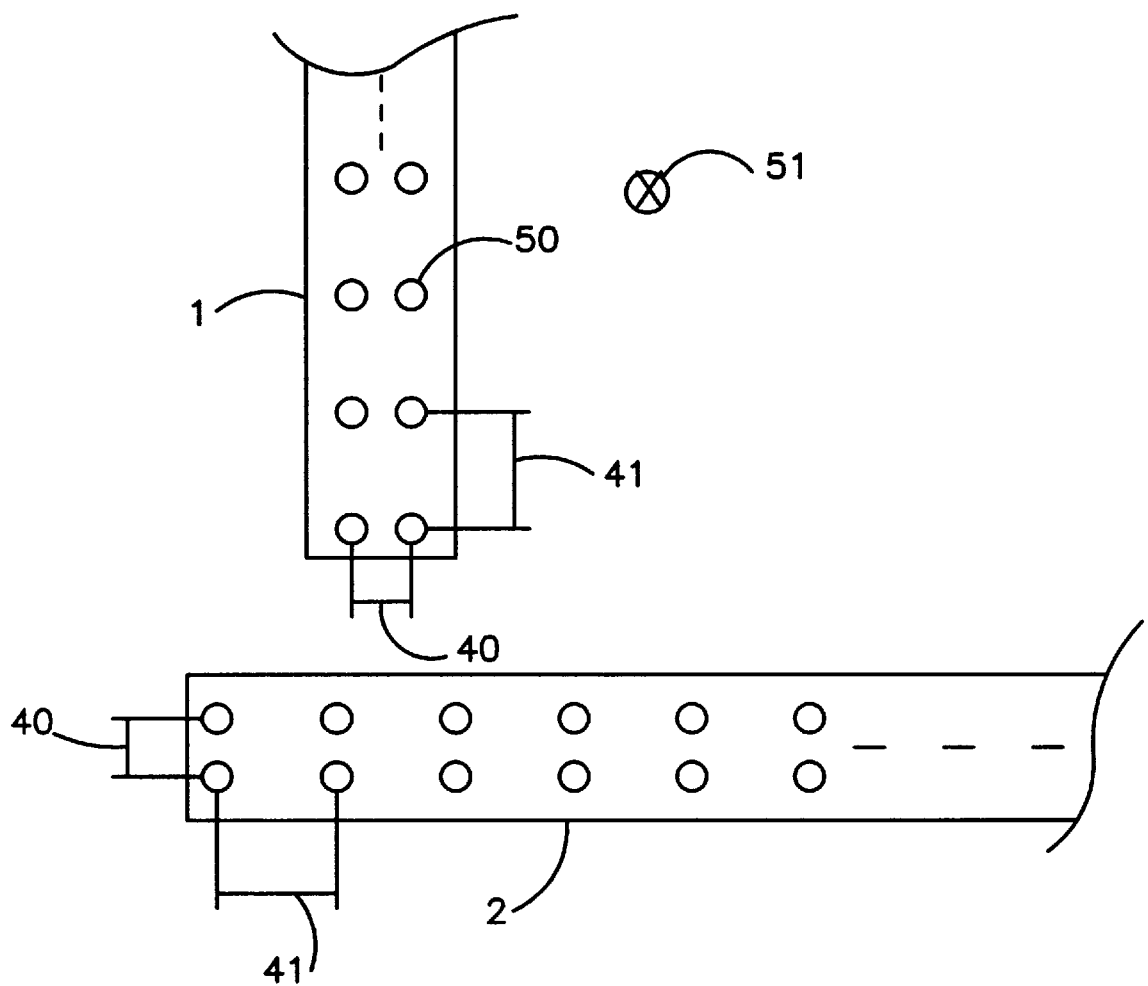

FIG. 2—a diagram showing the configuration of the interactive arrays of directional transducers.

Figure 3:
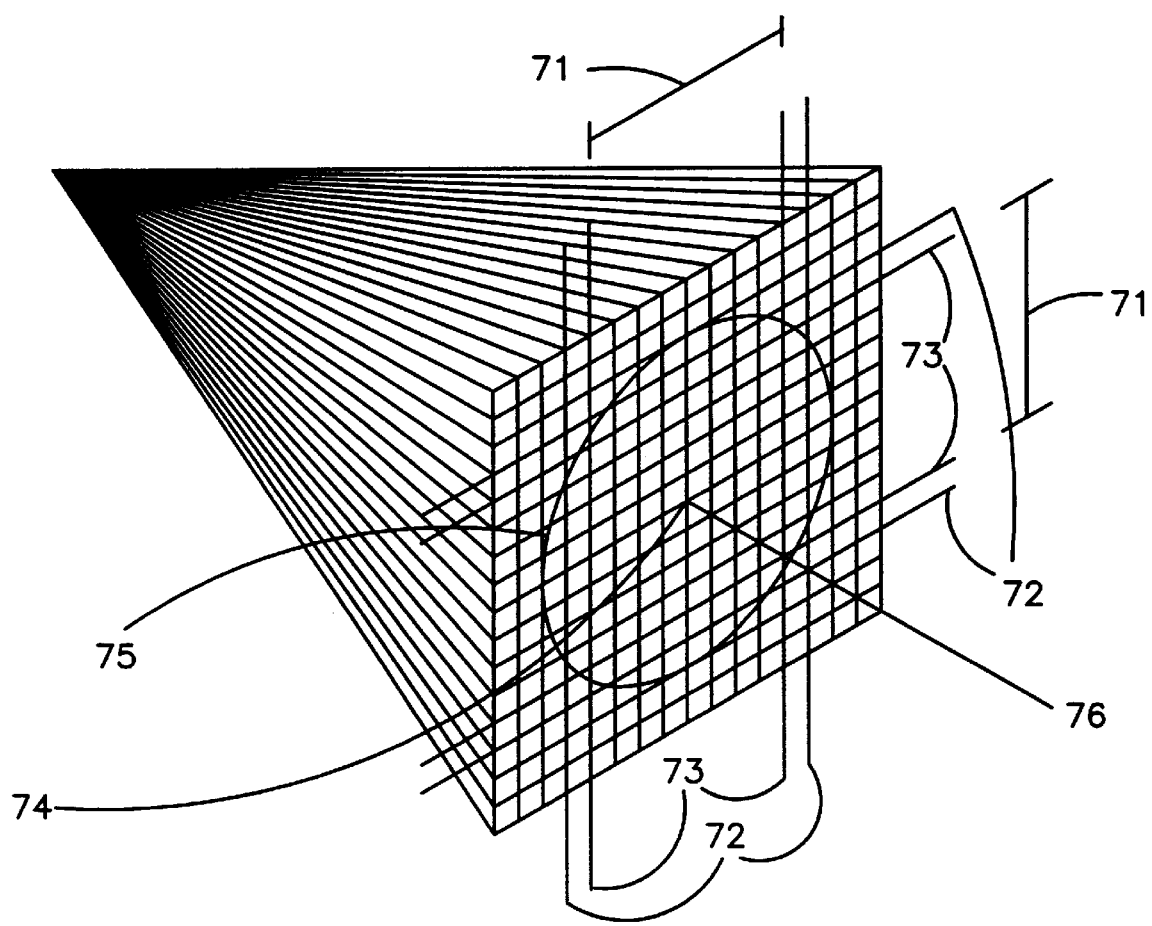

FIG. 3—a diagram showing grating lobe control.

Figure 4:
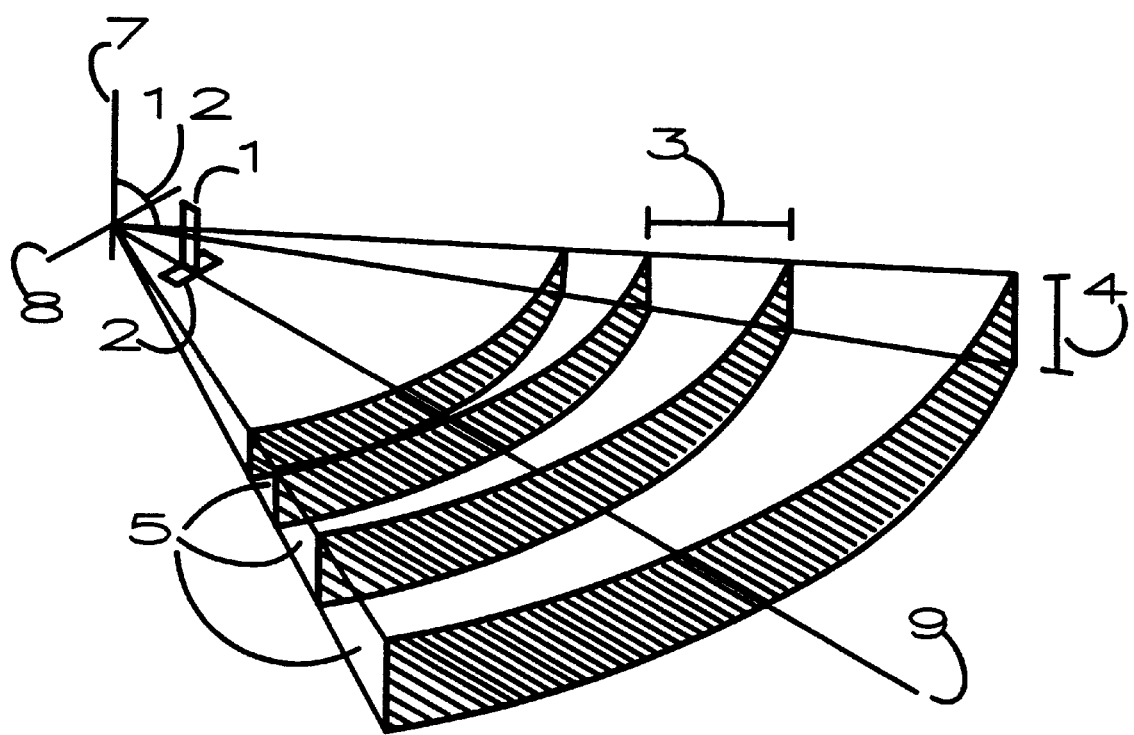

FIG. 4—a diagram showing the formation of transmit beam segments.

Figure 5:
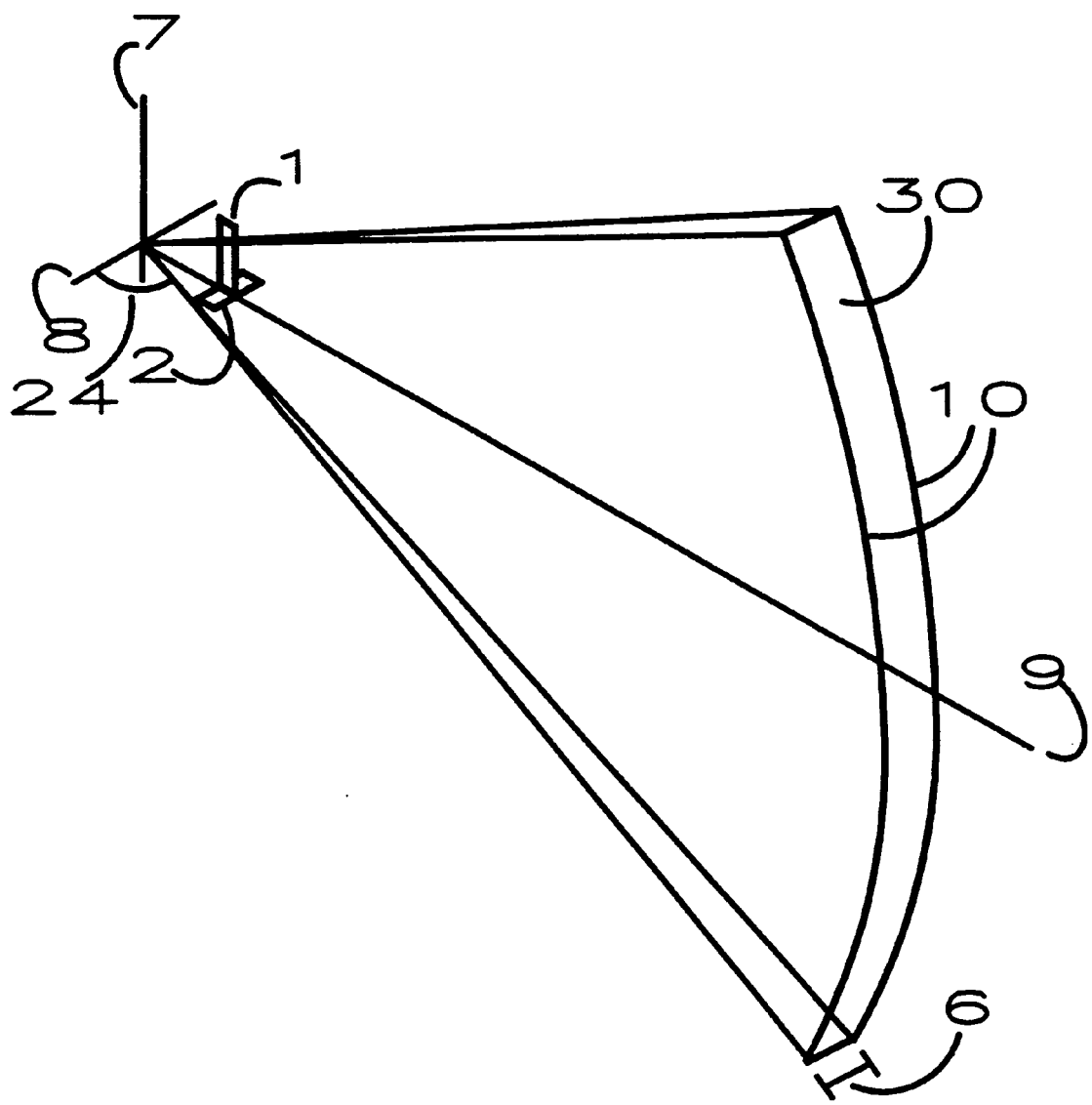

FIG. 5—a diagram showing the formation of a receive beam.

Figure 6:
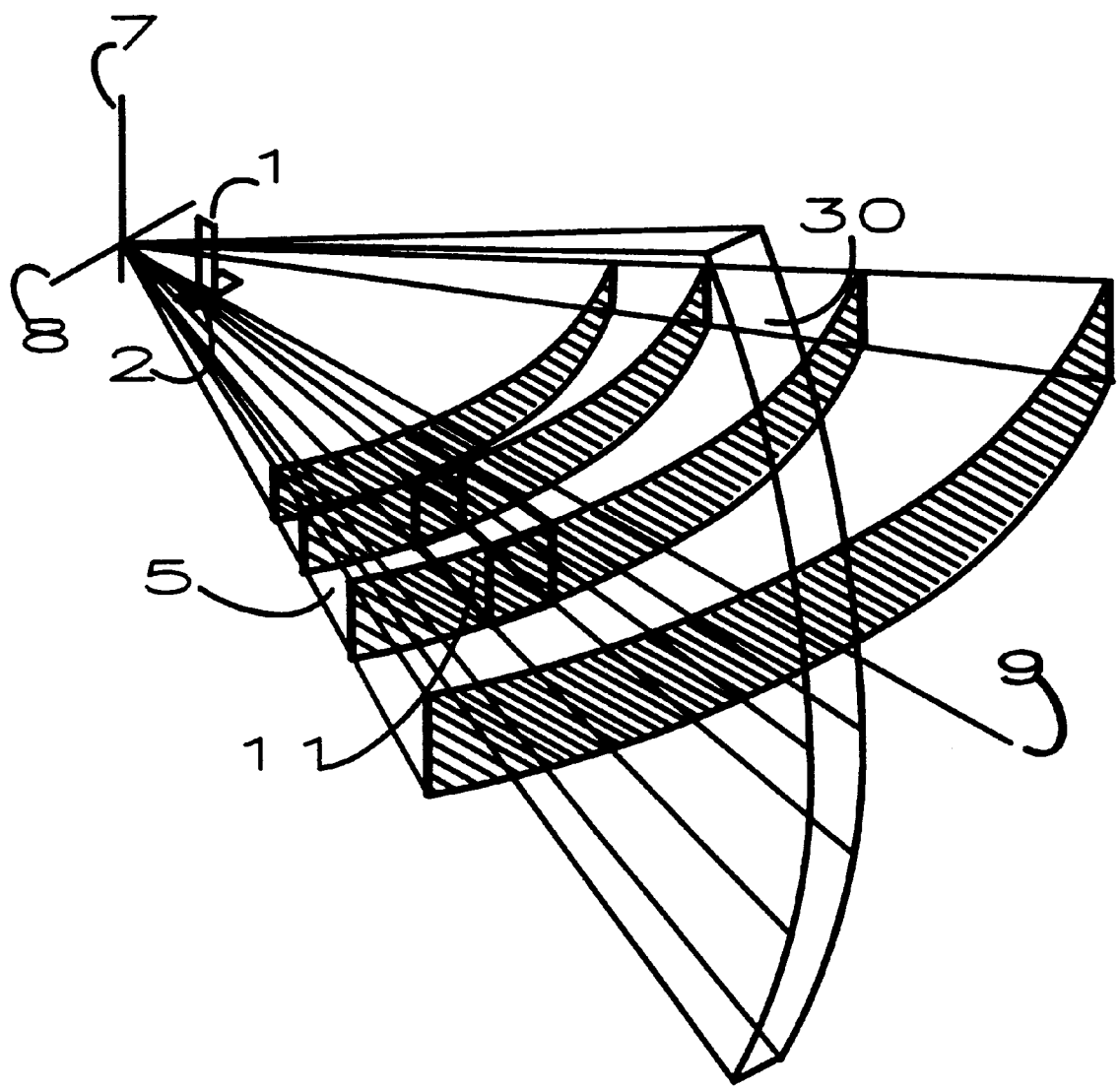

FIG. 6—a diagram showing the intersection of a transmit beam segment and a receive beam.

Figure 7:
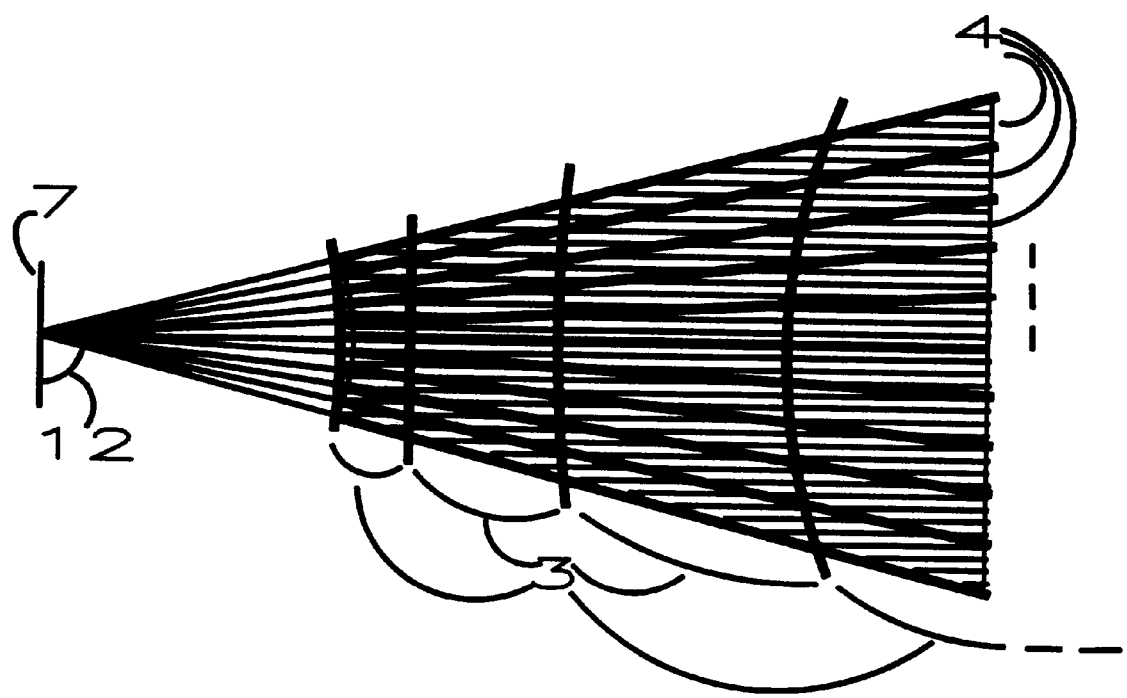

FIG. 7—a diagram showing the formation of beam segments by dividing a plurality of angle sectors into a plurality of range zones.

Figure 8:
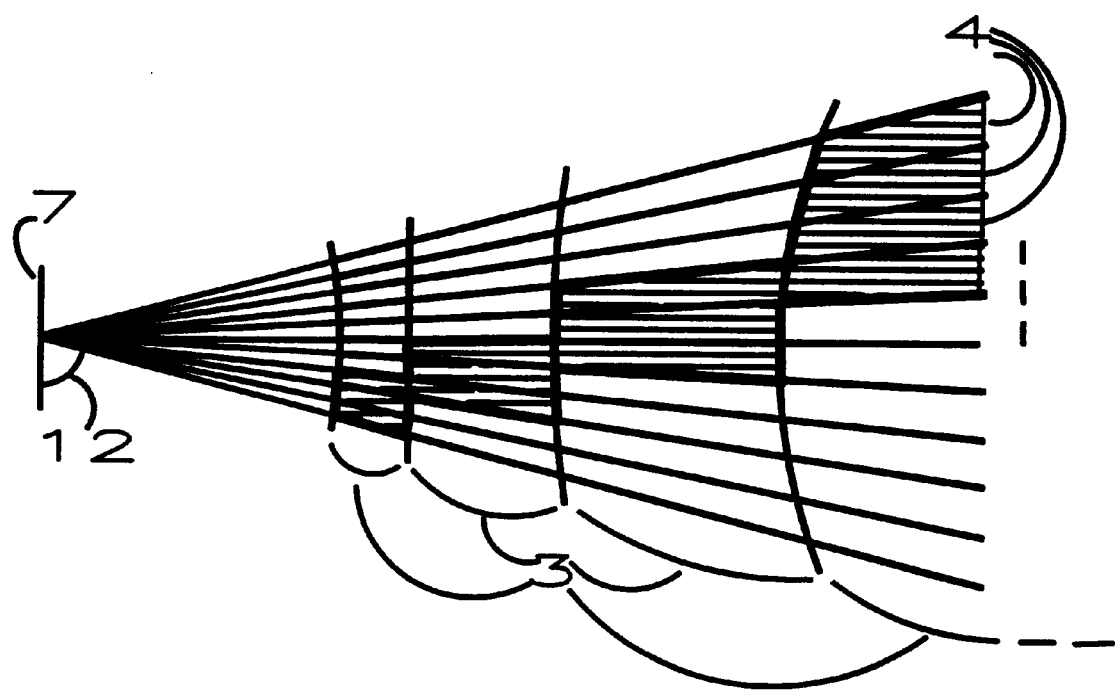

FIG. 8—a diagram showing the formation of beam segments by combination of a plurality angle sectors and a plurality of range zones.

Figure 9:
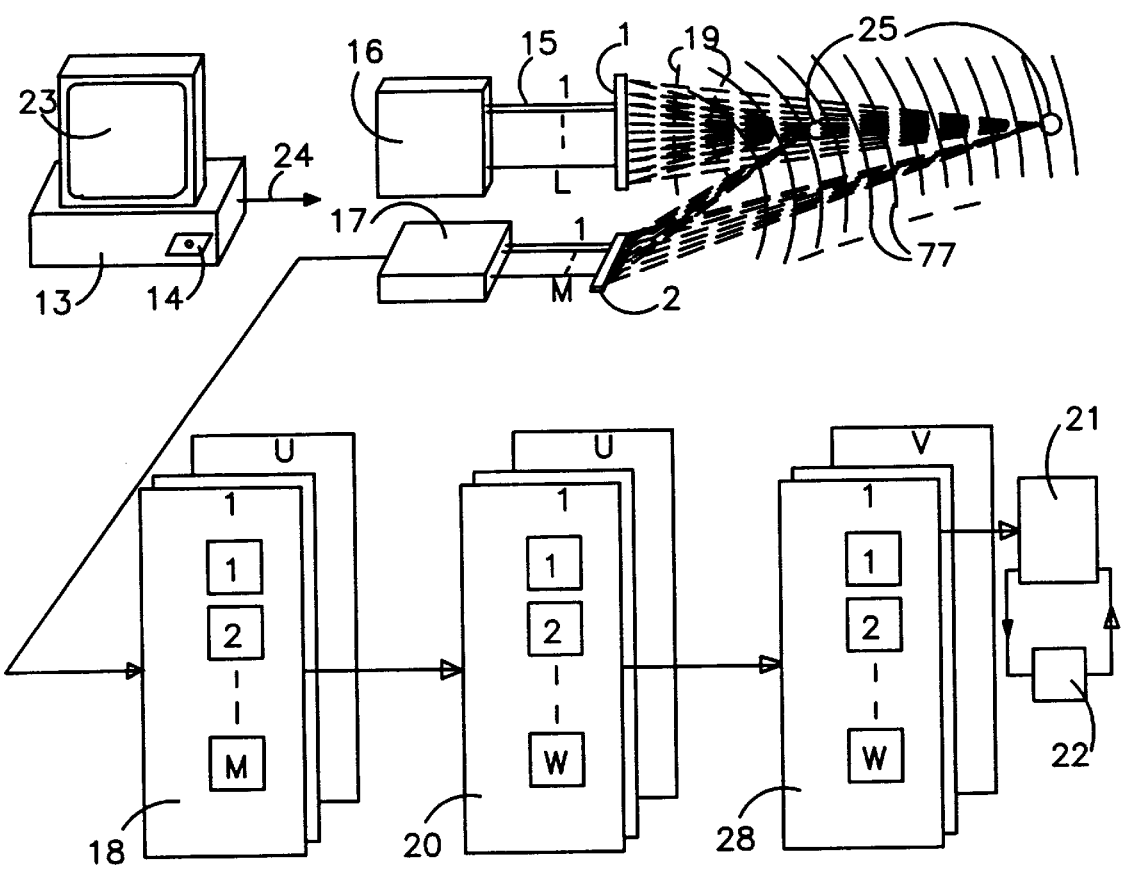

FIG. 9—a diagram of a system which is an embodiment according to the invention.

Figure 10:
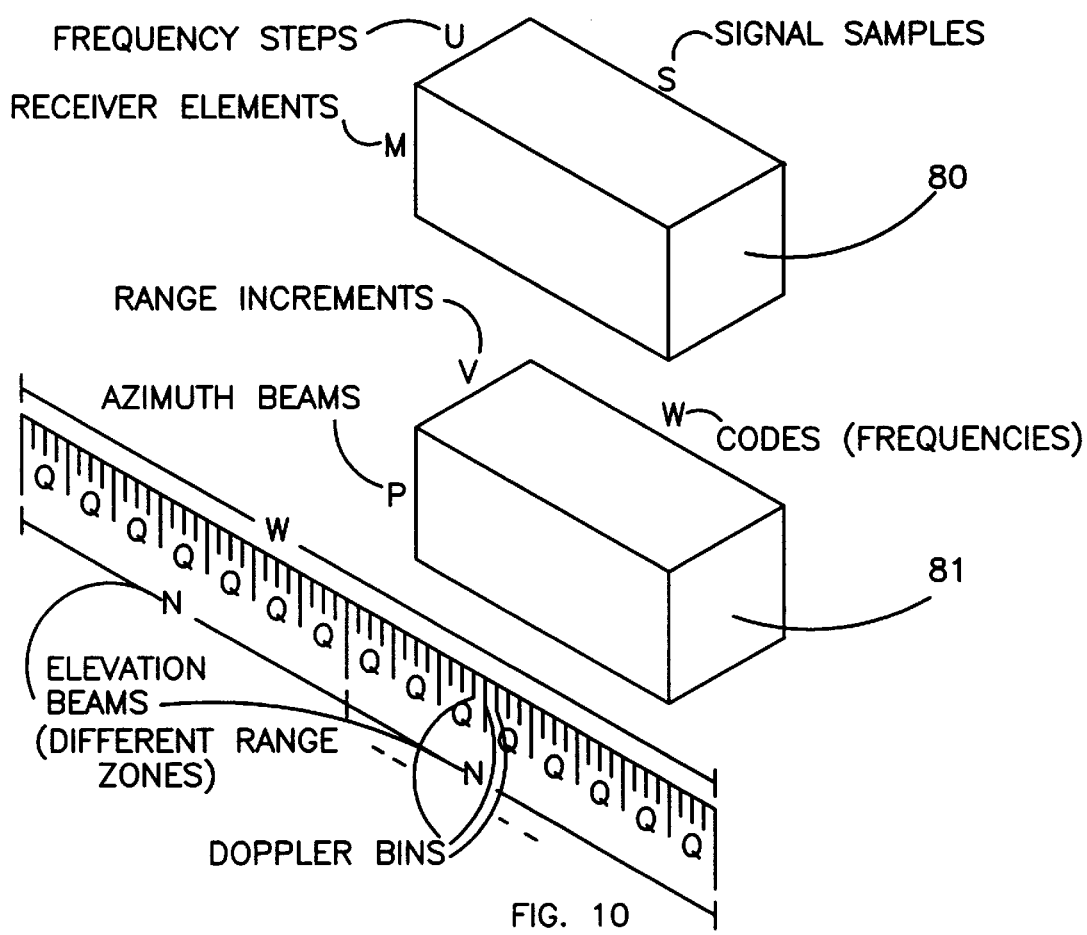

FIG. 10—a diagram showing dimensions before and after transform (FFT) processing.

Figure 11:
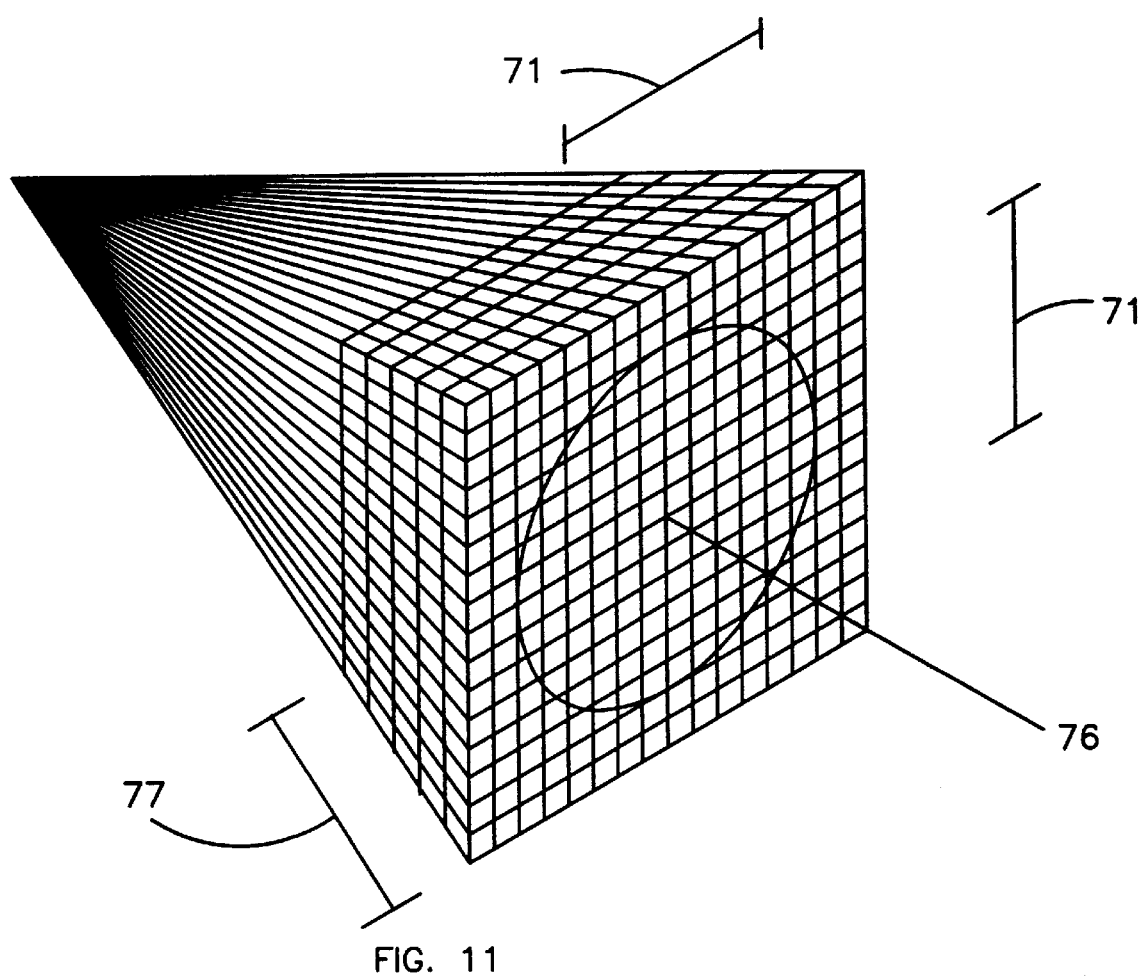

FIG. 11—a diagram describing the range resolution system in the context of the two dimensional angular beamforming system.

Figure 12:
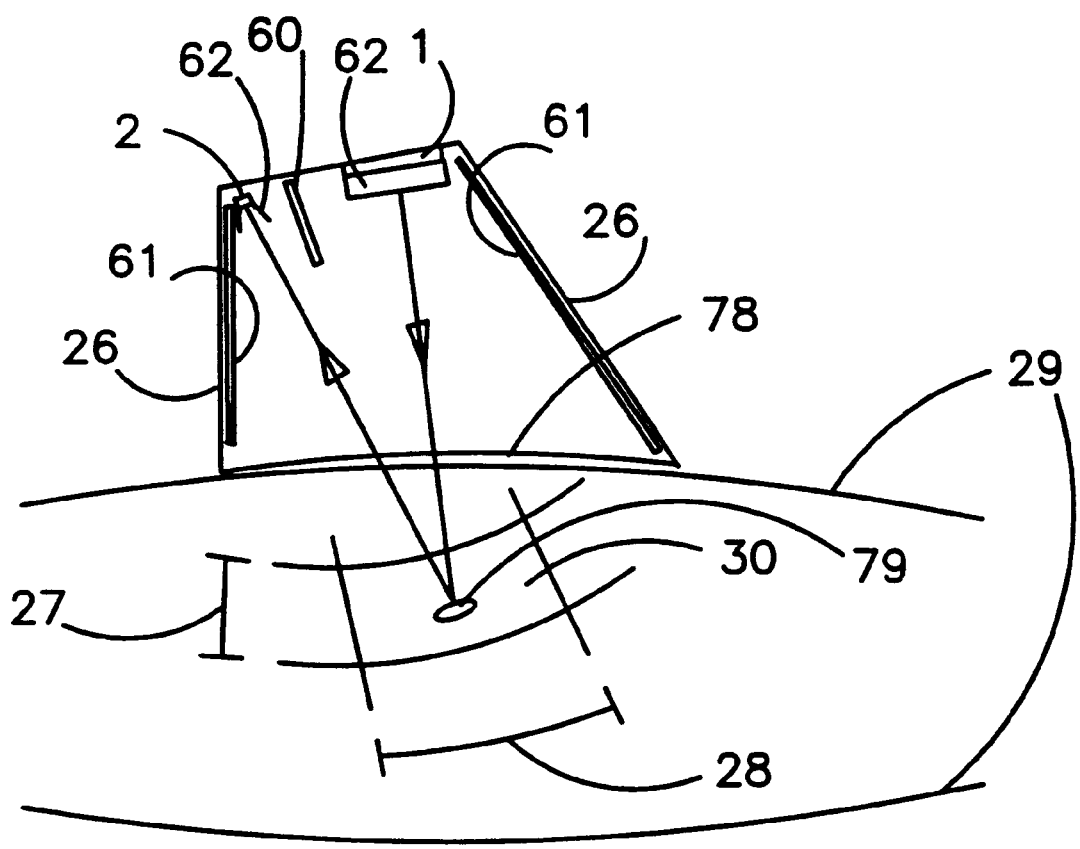

FIG. 12—a diagram showing use of acoustic control surfaces.

Figure 13:
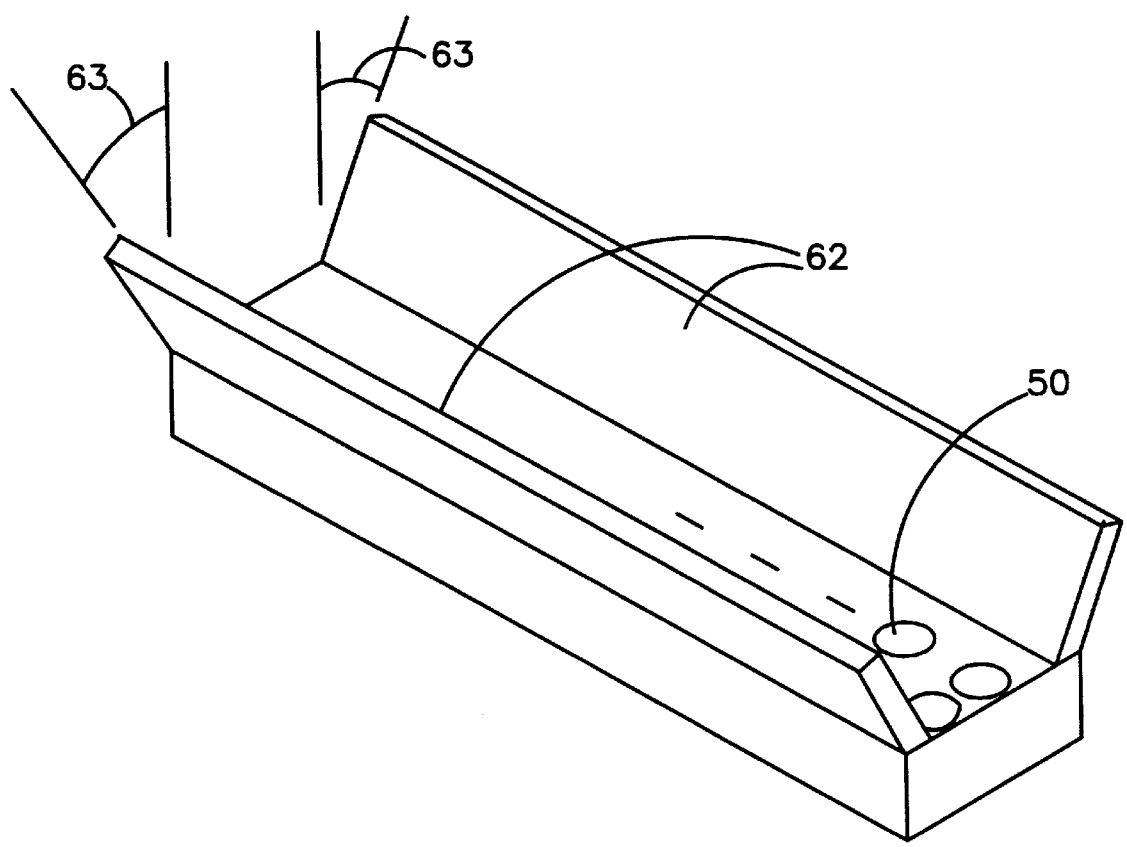

FIG. 13—a diagram showing rails attached to an array of transducers.

The preferred embodiment of this three dimensional beamformed television imaging system is used for viewing internals of living human bodies. FIG. 1 shows a general medical imaging application where viewing of objects 79 is carried out in a general body 29.

The new system includes a system of orthogonal linear arrays of transducers. For simultaneous transmit beamforming and simultaneous receive beamforming which was disclosed in U.S. Pat. No. 5,598,206 (January 1997) Bullis, which is entirely incorporated herein by reference. The application to medical ultrasound requires scaling the array dimensions, including the wavelength of the sound waves, by a scale factor that changes the size of the equipment to fit over a human body. The reduce length arrays are then coupled to a human body with material having acoustic properties similar to water. Additional features are added to make this into the new three dimensional system.

The present invention provides three dimensional real time imaging of the internals of the human body with capability of Doppler processing to enable selective viewing of moving internal body parts. For each pixel that is located in the conventional three spatial dimensions, the velocity distribution for particles in that pixel can be displayed. Additional features are included to further control and suppress acoustic effects that cause interference in the image.

This combination is a system of great importance in both medical diagnostics and surgical operations. Radar and sonar applications are also important. Air acoustic imaging is also of interest.

This new system is constructed of orthogonal linear arrays located in proximity to each other which are constructed of many transducers. The arrays are two dimensional with length much greater than width. FIG. 1 shows the transmitting array 1 and the receiving array 2. FIG. 2 shows an example configuration of transducers 50 in a transmitting array 1 and a receiving array 2. FIG. 1 shows one of the angle dimensions 28 of the field of view 30. The range dimension 27 is also depicted. A sample scattering object 79 is internal to the body 29 of the subject. A coupling material that is a medium for acoustic propagation is enclosed by walls 26 and transition surface 78. The supporting horn like structure formed by the walls 26 supports the arrays. Matching layers are between the transducers and the coupling material. The coupling material is a material having an acoustic impedance approximately equal to that of water. Water can be used, with appropriate containment provisions. The arrays are mounted near the throat end of this horn like structure. The other end is placed against the patient, with care to avoid air gaps. Signal generation and processing is done in nearby equipment that is attached to the arrays by a cable.

A variation involves immersing the arrays in a tub of water where the patient is also immersed.

FIG. 2 shows the configuration of transducers in the arrays. There are 128 transducers in each array in a 2×128 arrangement. The spacing between transducers, on center, is approximately one wavelength in the width direction 40 and approximately one and one half wavelengths in the length direction 41. Control of the spacing in both directions is a significant part of system design that is a distinguishing feature of the present invention. An individual transducer 50 is typically a directional transducer. Transducers are typically in a planar configuration but arrow 51 indicates a dimension perpendicular to the plane of illustration and this dimension can be used for variation of transducer position. Curved arrays are sometimes useful and conformal arrays are possibilities.

The transmitting array and the receiving array interact to resolve the scene. The resolution is determined by the width of the beams that are formed. This width, in radians, is approximately equal to the ratio of the wavelength to the array length.

The preferred embodiment uses simultaneous transmit beamforming and simultaneous receive beamforming. To accomplish this a system of codes is required. Each transmit beam is associated with a code and all codes are transmitted concurrently, overlapping each other in the same time window. Codes are generated by a computer, as instructed by software, and stored in special memory devices which can be read out in parallel during a transmission event. The effect of this is to give virtually simultaneous beams that cover the field of view without the elapsed time of sequential scanning.

After signal reception, the transmit beams are sorted out according to their respective codes. In the preferred embodiment these codes are simple, discrete frequency values which are sorted by simple filtering in a multiple channel filter, which is implemented using FFT methods.

The receive beamforming is a spatial filtering process, also multiple channels, that is also accomplished by FFT methods. This multiple channel process eliminates the need for sequential receive beam scanning to cover the field of view. It operates as if the beams are simultaneous, hence the term virtually simultaneous beamforming.

The reason for hesitation in calling these simultaneous, is that the computer processes operate in a complex fashion where sequential operations are done very quickly such that the channels are formed as if in parallel. The important distinction is that the transmission and reception of acoustic energy do not get repeated in sequential scanning processes that take a great amount of time. This makes it possible to accomplish further operations that would, otherwise, be intolerably time consuming.

The combination of virtually simultaneous transmit beams and virtually simultaneous receive beams means that the entire field of view is resolved as a result of a single burst transmission event. For 128×128 beams there are 16K (thousand) (approximately) channels thus formed.

These channels are memory locations that function much like video memory in common personal computers. The number that is in a memory location determines pixel brightness.

The quality of the beamforming processes depend on the quality of the radiation patterns that can be achieved and the combination of these patterns. A radiation pattern shows the complete beamformed directional response of an array including the intended beam direction and all other directions where side lobes and grating lobes occur. Grating lobes are unwanted increases in the response caused by periodic effects that include sparse spatial sampling effects. A grating lobe is sometimes called a spurious response. Array radiation patterns apply to both transmitting and receiving arrays.

The angular resolution is accomplished by the intersection of the set of transmit beams and the set of receive beams. Each long array retains the narrow beam characteristics but imposes limits on each beam in the wide beam dimension by use of the second, narrow, dimension of the array. The resulting beam can be described as a fan beam. The narrow dimension shapes a single wide beam, with grating lobes, by adding the adjacent elements of the pair together in phase. The pair of elements causes a strong notch in the pattern.

The three dimensional beamformed television system uses transducer spacing that creates grating lobe effects. These grating lobes appear on each side of the main beam, but are separated by a significant angle. In one angle dimension the grating lobes are separated from the main beam by one angle. In the other dimension the grating lobes are separated from the main beam by another angle. These angles differ by an amount that is to be adjusted by the designer. Grating lobe angles are adjusted by adjusting the transducer spacing. The two arrays interact to mutually cancel spurious responses in the opposite array because a spurious response from one array does not coincide with a spurious response from the other. Actual dimensions for a particular application require fine tuning of these directional patterns with consideration for the full directional characteristics of the radiation patterns which include the effects of individual transducer directionality. In the present invention the rails previously described serve to enhance the overall suppression effects.

There are possible array variations, such as linear arrays having transducer elements that are thin (typically about one wavelength) in one dimension and wide in the other (several wavelengths), such that this wide element dimension causes a narrowing of the associated element beam width. Arrays of such elements would be only one element wide. Each of the resulting arrays provides significant suppression of grating lobe effects caused by the other array, due to the described narrowing of the associated element beam width. If the narrowing effect is too much, such that it cuts into the ability activate or respond to the intended field of view, then expanding effects are needed. This can be done using methods to control the acoustic intensity and phase over the surface of the radiating aperture. The impedance matching layer can be adjusted to accomplish this. Material types, densities, thickness, and composite material ratios can be adjusted. Strips of thin absorber material can also be used. Combinations can be optimized. A well controlled beam shape can be obtained by using an element that is wider than necessary and then applying such a tapering function.

The interaction takes place because an image signal is a sequence of signal samples that have an amplitude determined by the response of both arrays. A target point must be present in a transmit beam and a receive beam at the same time if an image signal is to be received. If there was a direction where both arrays had a spurious response then another target point would cause an image signal which would be falsely positioned. The system response is the product of the two radiation patterns. By controlling the position of the spurious responses the arrays mutually suppress these spurious responses.

FIG. 3 shows the combination of methods of U.S. Pat. No. 5,598,202 (January 1997) Bullis and methods of the present invention for suppression of grating lobes. The rectangular cells shown represent the two angular dimensions 71 of resolution. The axis of the field of view is a line 76 through the center of the field of view 74. The circle 75 indicates the field of view boundary and the minimum region of illumination by an individual transducer. This region of illumination is typically not sharply cut off at this boundary. That is why significant other measures are needed to adequately control grating lobe effects. One such measure is the use of the array interactions and transducer element spacings. Each array contributes a notch at an angle indicated by the lines 73. An important additional measure is indicated by the boundary angles 72 which are angles at which significant cut off of sensitivity of the system occurs due to the addition of rails.

In the preferred embodiment, a total of 128 unique codes are transmitted to enable the transmit beams to give adequate resolution of one of the angular dimensions. Since narrow band coded waveforms are used in the preferred embodiment there is a coarse degree of range resolution. Narrow band coded waveforms do not provide fine grain range resolution. This fine grain range resolution is accomplished by the stepped-chirp system. Narrow band coded waveforms are also not consistent with sharp on and off times that allow exclusion of unwanted layers of a scene, and this is also accomplished with the stepped-chirp system. A gated-tone method is also used where dynamic range requires sharp cut offs.

In medical ultrasound imaging it is very important to see through various body parts in order to view the objective body part. These intervening layers show up as overlays on the layer containing the objective body part. This invention makes it possible to exclude layers that are not the subject of examination at a particular time, essentially making these appear invisible. Invisibility of parts of the scene is readily accomplished by selectively setting data values to zero.

It is also very important to sharply resolve detail of the object of examination in order to achieve clarity. This clarity determines the degree of sensitivity to slight variation in tissue composition. The present invention creates this clarity by fully resolving the volume of the scene. The size of the pixel determines this clarity. Large pixels tend to have a blurring effect since the scattering of a large set of particles is possible. Pixel dimensions are determined in the case of angle increments from the fact that angle resolution in radians is equal to the ratio of wavelength to array length. Range resolution in time is the inverse of the bandwidth. Range resolution in inches is an obvious conversion. Doppler resolution in Hertz is the inverse of the observation time in seconds. It is an obvious conversion to determine Doppler resolution in inches per second.

The sensitivity to see articles in the subject body that are very small, and therefore have small acoustic scattering levels, is provided. The size of the pixel relates to the degree of rejection of interference from random noise and from clutter caused by the application of the radiated waves.

Radar and sonar engineering methods are available to analyze and design a system to meet the requirements of a particular application. Adjustment to the medical ultrasound application must be made. The present document is in system level design terminology, and approximations are used which are appropriate for this stage of engineering.

The capability to view and evaluate moving internal body parts, such as the heart, is also an important feature of the present invention. The capability to view blood flowing is dependent on the level of scattering in the blood. Such capabilities can be explored with this new tool. The capability to measure velocity over the complete image field also exists in the present invention. This measurement is done using Doppler bins. These function like beams. Beams measure angle as a result of an occurrence of a signal in a particular channel. Doppler bins measure velocity as a result of the occurrence of a signal in a bin which is just another channel.

The complete data set is a vast number of such channels since the total number of channels is the product of the number increments in each dimension. A computer screen having a quoted resolution of 1024×768 has that product as the number of pixels, (=786K) and a corresponding number of memory locations are required to drive these pixels. In the preferred embodiment there are three spatial dimensions plus one velocity (Doppler) dimension so there are 128 azimuth increments by 128 elevation increments by 128 range increments by 8 velocity increments. This is a resolution of 128×128×128×8 (=16,777K) which requires that number of memory locations. These are called channels or bins, whatever the language one chooses. Representing the magnitude for each bin takes 8 bits in the digital system.

The invention enables the capability to guide a surgical instrument with great precision over a three dimensional path within the human body. This can be very effectively done using a real time display that shows all the critical organs as well as the instrument moving among such organs. Surgical dexterity is greatly enhanced by the invention that provides the view that is normally the mode of human vision. This is an elevation versus azimuth angle display. The present invention makes available the full three dimensional data set which enables image processing that creates an elevation versus azimuth view from arbitrary perspectives. To view the critical organs from several directions as the surgical instrument is moved would avoid damaging such critical organs.

The present invention will be a subject of medical research. It will be important to explore the many possible benefits of this new three dimensional tool. It may be able to do many things presently done with MRI imaging.

This three dimensional capability is made possible by the prior invention U.S. Pat. No. 5,598,206 (January 1997) Bullis to completely resolve two angular dimensions of a scene as a result of a single burst transmission. The combination of this prior method with another method for highly precise range resolution, results in this full three dimensional real time system. The range resolving process is termed, stepped-chirp. Chirp is a term applied to a signal waveform having a monotonically varying frequency. Monotonic means that the change is only in one direction, up or down, during the duration of the chirp. Stepping through this chirp gives an incremental approximation of a smoothly varying frequency chirp. In the present invention the stepped-chirp process is applied in such a way that it does not have to be a continuous waveform, that is, it can be done with time intervals between the tone steps. This step chirp method includes processing that transforms from the frequency domain to the time domain to give the time scale that is directly converted to the range scale.

The range resolving process is accomplished by repeating the original process a number of times with successive repetitions being done at sequentially stepped frequency. Where the original process uses multiple frequency codes to enable the transmit beamforming process, this entire set of frequency codes is shifted in frequency as a whole, for each step of frequency shift. As such there are two independent frequency scales of importance; one is for the beam codes and the other is for the stepped-chirp steps. The response frequencies of the receiver channels must be correspondingly stepped.

The image data available after the two arrays have resolved the two angular dimensions is a 128 by 128 block of complex numbers that represent the magnitude and phase of the reflected signals at each two dimensional angle cell over a large range extent. The stepped-chirp process of breaking this down requires that 128 of such 128 by 128 blocks of complex numbers be generated, each set at a different base frequency so that the entire set of frequencies used for transmit beamforming is stepped as a group. Matched stepping of the receiver code recognition channels is necessary. In each two dimensional angle cell there are thus available 128 complex samples that are then processed using the Fourier transform. The FFT method is appropriate. The Fourier transform operation converts these samples into discrete time interval samples. This directly converts to range.

The duration of the illumination time must be sufficient to obtain a full measurement over the range dimension of the field of view. It can be longer but that extends the range that must be otherwise be limited in order to prevent range ambiguities. Such ambiguities occur because the stepped-chirp method resolves a fixed number of intervals in range and then starts over, overlapping the second set on the first. The depth of field effects serve to cut this off. A sharper cut off also can be had by using a gated-tone method to be described later. For each azimuth-elevation pixel there is a set of complex data points each of which gives amplitude and phase of the particular frequency tone used for that step. The conversion to the time domain using FFT (fast Fourier Transform) methods gives the amplitude of the reflections as a function of time for each azimuth-elevation pixel. Range is directly obtained from the time scale.

A special requirement for the stepped-chirp method is that the steps for the stepped-chirp method be uniform and that the system phase response be linear over the range of frequency values. The linearity requirement is like the requirement for linearity in replica correlation radar and sonar systems. Specifically, the range of frequency values associated with a pixel must be linear. In this case the opportunity exists to measure the phase response for each frequency of the step and apply that as a correction to the phase in the processing system. This will remove the effect of hardware imperfections, including the transducer effects. It is done by measuring relative phase for all the frequency steps using a small point calibration target in a clear water medium. From this data the calibration adjustments can be computed. Then these are applied to the signals received during imaging operations.

Another special requirement arises from the fact that the range resolution cell size is the inverse of the total frequency extent over which the frequency is stepped. This bandwidth is the bandwidth that governs the range resolution. It also affects the beam angle positions where FFT methods are used. For fine grain range resolution the required wide bandwidth means that the beams, of the receive beam sets, are not at respective corresponding angles over all the steps of the stepped-chirp process. This must be corrected. The range resolution system needs for each of the respective beams to be at a particular, respective angle. Ideally they would overlap exactly, but this selection method allows use of beam angles that vary slightly. There will be slight blurring. The preferred embodiment will control beam selection in software which will control address indexing in the FFT processor that processes the stepped-chirp signal data. At the higher frequencies there will be more beams in the total angle extent than at the lower frequencies. Such higher frequency beams will involve some redundancy, since the outer beams will be grating lobes of the fundamental set. However, the grating lobe functions like a basic beam and can be selected to provide the needed signal The drawback is that clutter is increased due to the effect of including an extra, though uncorrelated, signal. This spreads or compresses the distribution of beam angles as required to enable the range resolution process to operate for a fixed angle.

In time delay beamforming, or in phase delay beamforming using the simple Fourier transform (not FFT) the delay increments can be adjusted. Efficient transmit beamforming can use either time delay or phase delay beamforming and the corrections are applied in the computer generation of the transmit waveforms. Application of such alignment corrections will cause the beams will lose their otherwise optimum contiguous nature, but the range resolution process will be more exact.

A result of applying these corrections is to correspondingly align all grating lobe sets. Thus, the full measure of grating lobe suppression methods of U.S. Pat. No. 5,598,206 (January 1997) Bullis will be applicable, as well as additional methods that are part of the present invention.

In the present invention the stepped-chirp approach is being used in the form of a 128 channel implementation of such a method combined with the orthogonal array system. The rules by which the range resolution relates to the step size and number of steps of the stepped-chirp signal are found in the documentation for these systems. A 256 step signal gives 256 range cells of which about half are of no interest. Range aliasing occurs which means that the 256 range cells are resolved repeatedly as the range extends indefinitely. Attenuation from absorption and spreading loss help minimize this problem, but a sharper way to cut off the aliasing effects is to use the gated-tone method.

The entire process is rapidly accomplished because of the instantaneous array scanning processes. The efficiency of the fast Fourier Transform (FFT) methods makes it possible to efficiently and economically carry out the processing, even though beam angle corrections are required.

The overall signal generation, transmission, reception, and signal processing system must provide for alignment of range bins such that the range bin signals can be correctly related to a common reference plane. The relative phase of signal information gives the range scale. Zero range is where there is no phase shift due to the path of propagation. Phase offsets at transmission are corrected. The alignment of range bins must take into account the fact that the bandwidth allowed for the transmit beamforming codes causes a skew in the range scale since ranges determined for the lower frequency beam codes will have a slightly different scale than the ranges determined for the higher frequency beam codes. The skew will be smooth if sequential codes are used.

A chirp method that is related to the stepped-chirp method is possible. In this variation to the preferred embodiment a sweeping frequency signal is used that has a linearly, continuously varying frequency function rather than the discrete steps of the stepped-chirp. Received signals are mixed using a multiplication process with filtering. This results in a signal where the range bins are manifested as discrete frequencies and spectrum analysis processing determines the strength of signal at each frequency on the scale. Beam shift effects must be taken into account in a manner similar to the method described for the stepped chirp, except that the beams are changing rapidly during the transmission. This variation works best with a sequential transmit beamforming system. It is also best if used with time delay processing methods since the wide instantaneous bandwidth is not readily accomplished using FFT beamforming methods. The spectrum analysis is compatible with FFT methods.

The capability to selectively process Doppler shifted signals is achieved by separating the transmit beamforming code frequencies (tones) so that there is space for Doppler shifted signals. These can then be selected for range resolution processing by choosing all bins that are the same separation from the nominal frequency for that transmit beam. If Doppler bins are also created then there is an additional frequency scale. This Doppler scale is created by separating the transmit beam code frequencies by the number of Doppler bins needed. This allows room for the shifting frequency results that indicate velocity. To combine this with the range resolving, stepped-chirp process, the Doppler bins, or channels, are formed for each of the steps of the stepped-chirp.

There are design tradeoff issues between fine grain range resolution and Doppler resolution. The wide bandwidth to get fine grain range resolution means that there will be a slight smearing of Doppler bins. Fine grain Doppler resolution requires more frequency codes so for a given bandwidth of the system there will less frequency steps available for the range cells. Since the range resolution is fixed by the overall bandwidth, the result is that there are fewer range cells that can be resolved.

Further provisions are needed because the process of transmitting and receiving at the same time causes dynamic range problems. Doppler systems tend to lead to this type of problem because long duration codes are needed to get fine grain Doppler resolution. One such provision is a gated-tone method. This is a process of interrupting the transmitted tone and selectively activating the receiver so as to operate like a pulsed system except the phase relationship with the fundamental tone is maintained for all pulses. Each of the frequency codes is a tone so all of the tones are to be gated in this manner. This method can be used to achieve fine grain range resolution but it must be done using time delay beamforming methods since the bandwidth effects cause the off center resolution to be blurred where phase adjustment beamforming methods are used. In the preferred embodiment this gated-tone method is used only to overcome the direct crossover problem and it does not need to be so precisely implemented.

The gated-tone method is important where the range (in time equivalent) is short compared to the time duration of signal bursts needed. It prevents the effects of saturation and minimizes range aliasing effects. Saturation can occur because of the direct path from the transmitting array to the receiving array. This method simply involves turning the transmitted tones on and off and turning the receiver on and off in the appropriate synchronized time relationship that the desired reflected signals are received and the undesired coupling from the transmitting array direct to the receiving array is blocked in time as are reflections from behind the range zone of interest. The narrow band filtering effect of the transmit code recognition system ignores the interruption, except for the resulting decreased signal level. The requirement is that the tone be turned on and off but the phase of the tone in the resulting pulses is locked to the phase of a continuous sine wave signal. The other critical requirement, is that the frequency components caused by this gated-tone pulsing operation do not overlap the frequency components of the transmit beam coding system. For Doppler capable systems the transmit beam coding frequencies are spread, further limiting the available frequencies. This can be a difficult restriction in some applications. The coding system that uses discrete frequency coding must occupy a certain frequency extent that is set by the capability of the code processor to separate these codes, that is, to resolve them. Resolution is the inverse of time duration of the transmissions. The gated-tone signal creates a set of frequencies, the minimum being the pulse rate. This pulse rate must be greater than the band occupied by the transmit beamforming codes. In a typical design, some margin is needed to allow for imperfect filtering.

The fit of these new methods with the earlier invention U.S. Pat. No. 5,598,206 (January 1997) Bullis is extremely fortunate since it enables a very powerful three dimensional imaging system. These methods allow use of the efficient narrow band beamforming systems that are amenable to FFT processing, yet the range resolution that typically requires wide band time delay processing is still accomplished.

Beyond the range resolution issues, other features are important. These also include a combination of U.S. Pat. No. 5,598,206 (January 1997) Bullis and new features to accomplish the present invention.

Each of the many transducers that comprise the orthogonal arrays are, individually, directional in response. This prevents a front to back ambiguity that would otherwise be a problem. The directional response also helps to attenuate the spurious response of the arrays which was described previously. This effect is applied to spurious responses of the same array and of the opposite array so it is a double attenuation effect. FIG. 2 shows an array of directional transducers 50.

The array radiation patterns are modified by weighting of the transducer signals by adjusting amplitude and phase of individual transducers. This is done for transmitting and receiving systems.

The present invention also provides for additional measures to enhance quality of images by use of acoustic path control surfaces. In general these involve planar surfaces, though shaping is sometimes used.

The first of these is shown in FIG. 13. It is a system of rails 62 that are attached to the arrays parallel to the long dimension of each. These rails are flat surfaces that reflect energy serving to redirect the grating lobe energy to enhance the shape of the beam pattern. These are placed along both sides of each array. By choice of angle 63 the benefits of the notch in the directivity pattern that is caused by use of multiple elements in the narrow array direction are retained, but much of the grating lobe energy is redirected to enhance the main beam direction. Planar rails work well. Tapered absorber material attached to the outer edge suppresses diffraction effects and various flaring methods also are useful for this purpose. The rails are angled so as to optimize the shape of the directivity pattern. For arrays that are two elements wide, closely spaced, there is a notch that separates the main lobe and the first grating lobe. The exact angle, in the far field pattern, can be calculated or computed. The rails form an angle with the normal to the array surface 63 which is slightly larger than the angle of the notch 72 shown in FIG. 3. Diffraction treatment material is vinyl tape that is added in successively increasing layers approaching the outer edges to taper the absorber effect so that there is maximum absorption at the outer edge. This is done over a distance of two wavelengths. Three layers of tape at the maximum thickness give significant improvement of the diffraction effects. Many other types of absorbing material are available. Diffraction treatment shaping 96 is also useful.

Another type of acoustic control surface is needed when operating near a reflecting surface which tends to fold the set of grating lobes, from the long dimension of the arrays, over into the desired field of view, such that the reflecting objects then give a spurious bistatic reflection such that these objects then appears in the main image as doubles. Bistatic reflection paths are reflection paths where the reflected energy does not travel on the same path as the incident energy. The incorporation in the system of an attenuating panel, of comparable dimensions as the long array length, serves to minimize this undesirable energy. Such surfaces 61 are indicated in FIG. 12 for the ultrasonic medical imaging system. Here the arrays operate within a horn like structure so as to convey energy to the body of the patient. The walls of this horn are reflective. An absorber material is used placed on these walls to terminate stray paths. Felt is a simple choice of material.

Another control surface is a barrier panel that is placed between the arrays to minimize direct coupling during long duration transmission. In some applications this eliminates the need for the gated tone method. FIG. 12 shows such a barrier panel 60 which is covered with absorber to avoid creation of stray paths. Blockage is very effective except for diffraction effects which are reduced by serrated absorber on the outer edge. This barrier is connected, without gaps, to the structure that holds the arrays and the sides of the enclosure. FIG. 12 is a cut away view that can not show the front and back sides of the enclosure.

The range resolution methods require wide bandwidth even though individual burst transmissions are quite narrow in bandwidth. Acoustic matching layers are used to expand the transducer bandwidth. A means of acoustic radiation (transmission and reception) pattern control is use of tapered impedance matching layers such that the effective aperture of individual transducers is shaded. This is a method of shaping the main beam and suppressing the magnitude of sidelobes. Sidelobes occur in systems that transmit or receive radiating wave signals. They are fundamentally related to the dimension of the associated aperture. These layers taper the signal intensity distribution over the aperture. Phase distribution can also be tapered. Thus, materials and material thickness can be used to achieve the desired pattern. This can, in the limit, include total blockage of part of the aperture. The opening then constitutes a new aperture. Matching is also accomplished by the use of a tapered transition that can be referred to as a horn. Various horn shapes are useful, the nature of common brass musical instruments illustrates such horns in large dimensions.

The transducers are individually constructed and assembled in an array such that they do not allow damaging stray coupling. A modular array construction method is used where a fraction of the total number of transducers is assembled as a module. In underwater applications this is a water tight enclosure. The use of matching materials and methods is done on a modular basis or it can be applied to the full assembled array. Transducers within the module share signal and control lines. The whole array is then assembled from many such modules. This construction method provides array production and maintenance efficiency.

The transducers themselves include impedance matching devices to provide effective coupling to the water with sufficient bandwidth to handle all the codes required.

An important consideration is that the system operates in the near field. Operating in the near field means that wavefronts at the array can not be represented as a planar surfaces. It also means that the description of beams, in terms of cones, becomes inexact, though it is still accurate enough for much of the interesting operating range. Operating in the near field requires a complicated focusing process for the beamforming operations. Both transmitting and receiving arrays must be focused. This can be done by curving the arrays. It can also be done electronically by adjusting time delay or relative phase of the signals, whether they are being transmitted or received. Phase adjustment is much easier though it has certain limits of effectiveness. The requirement is that the signals arrive at the range of interest with constructive phase relationships. The depth of field is the size of the range zone over which this occurs. Objects outside this depth of field tend to not be seen. The depth of field applies to each beam of both the transmitting and the receiving system. It can be useful in excluding layers that are interfering with the image in the depth of field zone. It can be annoying where it limits the size of the three dimensional zone that is being imaged. In either case it requires design consideration. The depth of field becomes very small as the arrays are moved close to the object of interest and it expands as they are moved away. A practical design process trades the required separation distance against the need for repeated operations with different phase adjustment. U.S. Pat. No. 5,598,206 (January 1997) Bullis provided for a range zone based focusing system for transmit beams and a time varying focusing system for receive beams. This could either adjust for narrow depth of field or adjust for multiple overlapping zones which widened the depth of field. These options apply to the medical ultrasound system. A simpler approach involves moving the arrays back from the patient to widen the field of view. A wave carrying medium must be present between the patient and the arrays. Suitable materials exist. Water can be used, either in a tub application, or in a shaped container that is moved with the transducer arrays.

The extended depth of field focusing capability is provided by a beam segment transmit coding system. It is a part of the two dimensional imaging system that is U.S. Pat. No. 5,598,206 (January 1997) Bullis and, in turn, part of the present three dimensional system. A concatenation process is required to integrate this with the range resolution system. This extended depth of field method involves an additional dimension of range for each transmit beam. FIG. 4 shows the formation of transmit beam segments as a beam that is divided into range segments. Here the term range is used in relation to the depth of field effects, not the fine grain range resolution system. The three dimensional beamformed television system produces signals that focus sharply in each beam segment. Sharp focus means that signals that arrive at any point in the beam segment have a phase relationship such that the sum of these signals is within 3 dB of the sum of phase adjusted variations of the same signals at that point, where the phase adjustments cause the signals to be all in phase. In general the arrays are flat with curvature to focus being an electronic adjustment to the signals. Curvature can be useful. Conformal arrangements are also appropriate in some applications.

This beam segment transmit coding system is a two dimensional transmit coding system. One dimension is the transmit beam angle and the other is range which is divided into zones. The transmitting array elements must produce signals which are differently focused for each range zone in order to achieve sharp focus over the volume of interest. The other dimension is angle which is divide into beams where a beam is an angle sector. The combination of these two dimensions is described in reference to FIG. 4. The transmitting array 1 and the receiving array 2 are perpendicular to each other. The boresight direction 9 relative to an array is a direction perpendicular to an array. This transmit coding system establishes a set of transmit beam segments 5. A range zone 3 is the region between the shaded surfaces. The range zones become wider with increasing range until the last one, which is in the far field, where there is no outer boundary. Angle sectors 4 are defined in terms of angle 12 relative to a reference line 7 parallel to the transmitting array. A transmit beam segment 5 is determined by the intersection of a transmit range zone 3 and a transmit angle sector 4. A unique code is associated with each transmit beam segment. Each unique code is generated through the transmit beamforming process where the correct time delay is provided to focus at that particular beam segment. All beam segments are formed by a single burst transmission. The completion of the transmit coding system is the process of code recognition and associated channel formation which is done in the received signal processor.

The concatenation is needed to carry from one range zone to the next where range cells must be smoothly carried over from one beam segment code to the next. This involves dropping of the range cells that were developed outside the associated zone.

FIG. 5 shows the formation of a receive beam. It is defined as an angle sector 6 where angles 24 are measured in reference to a line 8 parallel to the receiving array. The dashed lines indicate the region over which a receiving system channel is sensitive. The boundary lines 10 are for illustrative reasons and do not represent a boundary in any functional sense.

The ultimate system resolution cells, or pixels, are formed by the combination of transmit beam segments and receive beams. FIG. 6 shows the intersection of a transmit beam segment and a receive beam to form a box which is a system cell 11, the edges of which are shown as heavy lines.

FIG. 7 and FIG. 8 show different arrangements of transmit beam segments which are among the options to be selected depending on operational needs. FIG. 7 shows the complete system where focus is sharp over the full volume. In these figures the multiple transmit beams are shown as angle sectors 4 which are arranged according to angle 12 relative to a line 7 parallel to the transmitting array. For some search operations the arrangement of FIG. 8 is appropriate where a particular scene expectation can be spanned with a less comprehensive coverage. This latter arrangement is analogous to eye glasses which are called trifocals. Such analogies are inexact since this is a transmitting system which has no direct counterpart in human vision.

It should be noted that the geometrical descriptions are inexact representations, especially in the near field. Also, the range zones are established with overlap of adjacent range zones. The range zone boundary shapes are optimized for operational needs.

The processing system of this embodiment includes a combination of hardware types and the necessary software. Hardware includes analog and digital circuits and both general and special purpose computers. Digital signal processing is an important part of the system which helps to perform the processing very efficiently. This is a changing field with new, more powerful hardware continually appearing. Still, the functions remain equivalent.

The system functions are depicted in FIG. 9 for the preferred embodiment. The signals used to drive the transducers 15 are based on the coded signal waveforms generated in a general purpose digital computer 13 using software 14. The software determines the signal code samples and includes modifications to the code to take into account Doppler effects, provide aperture weighting functions and a variety of system compensations including compensation for imperfect matching of the transmitting transducer elements. Recognition of the code is done after reception.

The engineering of the signal burst generator 16 provides for a linear capability such that components of the drive signals do not mix and such that the times when the transducer output saturates are infrequent. It also provides drive signals 15 to drive a large number of transmitting array 1 transducers simultaneously.

The linear requirement of the transmitter system is an issue in system performance. In the software controlled process of generating the collection of codes that drive each transducer there are times when the addition of many codes gives high peak amplitudes. If linearity is maintained, this limits peak power levels. If saturation is allowed then higher power levels can be used, and this is effective during most of the transmission event, but the result is a source of image clutter. This can be minimized if corrections are applied to transmit signals to control high amplitude peaks in an orderly way to preserve coherent energy as much as possible. This is done with software recognition of a short period of time of excessive signal and temporary application of a scale adjustment. Taper functions can be used to optimize the transitions. These measures enhance signal to clutter ratio.

If there is motion of the system relative to the scene being imaged or if there is motion of an object in a scene then the received signal waveform is not the same as the transmitted signal waveform and the signals used for comparison in the code recognition process are modified to compensate for the Doppler effect. Both types of signal waveform modification are implemented in software 14.

Piezo-electric devices in the transmitting array 1 convert the drive signals to acoustic wave signals which radiate over the scene to be observed. The signals from the transmitting array elements are phased so as to focus at different ranges. The wavefront curvatures 19 show this. The signals from each element are a composite so that both curvatures are created simultaneously. A portion of each composite signal is the signal which provides the close in curvature. Another portion provides the far away curvature. They function as if they were separate because of the coding system. A number of such curvatures are provided for each beam.

A primary benefit of the present invention is depicted by the range increments 77 which give the third dimension of fine grain resolution.

The scattering centers 25 reflect a portion of the incident signal energy. The reflected signals are received by the receiving array 2 where piezo-electric devices convert the acoustic signals to electrical signals.

The signals from the receiving array transducers are mixed, filtered and converted to digital form 17 and then subjected to the code recognition process 18 which separates the composite signal waveforms into code channels. Receive software 14 controls this process through the same general purpose digital computer used to generate the transmit signal waveforms. The receive software provides the comparison waveforms.

Appropriate control instructions 24 for the system set up transmit signal waveforms, amplitude and frequency of local oscillators, system timing control, and processor operating controls.

FIG. 10 shows the organization of the system data. The initial block of data 80 that results from an exposure event contains S signal samples from each of M receiving transducer elements for each of U frequency steps. From the initial block of data transform processing shown in FIG. 9 creates a block of data where there are W code channels for each of P azimuth beams for each of V range increments. FIG. 9 show a code recognition process 18, receive beam formation 20, and range increment processing. FIG. 10 defines details that are generally indicated in FIG. 9.

The Doppler mapping capability is accomplished by expansion of the code system where the transmit beam codes are spread to allow room for Doppler shift effects to be recognized by the code recognition process. FIG. 10 shows how these codes, being frequency codes, are integrated into the system. The total number of codes W enables operations where signals are organized in sub dimensions. In the W codes there are two sets of N transmit beams, here described as elevation beams. Each set is associated with a range zone where focus is sharp. Beams in these two sets overlap at their respective angles. At each elevation beam angle there are Q possible Doppler bins. If there is no Doppler shift caused by the scattering centers in the field of view, then a center bin responds with a number proportional to the scattering strength for that position. If there is a Doppler shift for that position then one of the other bins responds. The entire field of view is mapped for velocity from this data.

The range increment channels are obtained by conversion from frequency domain to time domain. Samples in the frequency domain are the frequency steps U. A Fourier transform converts the frequency steps to range increment channels V. An obvious conversion from time increments to range increments is accomplished inherently in the display processing. FIG. 11 shows the spatial resolution that is accomplished by the three dimensional system. The range dimension 77 is indicated. The entire field of view is covered by the rectangular blocks that are the final resolution cells in the spatial dimensions. Comparison with FIG. 3 makes clear the relationship of range increments with the angular resolution cells formed by the two dimensional system. It must be pointed out that the original beamformed television system U.S. Pat. No. 5,598,206 (January 1997) Bullis actually formed range increments inherent in the coding system used, but it was difficult to achieve this fine grain resolution. There is also a degree of range resolution inherent in the beam segment system of that original beamformed system. These original system methods have their use in the new system, either as performance enhancements or simpler modes that give higher image frame rates.

There is a code channel associated with each of the transmit beam segments previously described with reference to FIG. 4. The simplest coding system associates a discrete single frequency with each transmit cell. These Fourier transforms complete the coded transmitting system. Fourier transforms are a method of implementing filter channels. Each channel responds to a particular frequency. Motion of the imaging system must be compensated for so that Doppler shift will not put signals in the wrong channels. Other codes are available through the computer.

Returning to reference to FIG. 9, the receive beamforming process 20 is depicted. This beamforming system establishes a set of receive cells for each signal code channel. The system is organized where the signals received are stored in blocks which represent receive range zones. These are not the same as the transmit range zones. These receive range zones must be sufficiently small that compensation for wavefront curvature can be accomplished with a single set of phase or time delay adjustments for the signals received in the time interval associated with each receive range zone. This focusing has a counterpart in the transmitting system, but hardware considerations and the desire to provide measurement of distance resulted in a greater number of receive range zones.

The signal processing must be fast enough to complete the processing of the collection of signals received as a result of a burst transmission in a time interval determined by the rate of repetition of the transmission burst interval. After data is collected at the successive steps of the step chirp another processing cycle is required to perform the range resolution process. Two such devices with appropriate memory can operate in overlapping mode. Signal samples are represented as complex numbers. These samples are stored in buffered memory blocks where switching of buffers enables successive processing functions. Matrix inversion and reverse order of bits operations are instantly accomplished by enabling of different buffers. Signal processing by FFT methods is accomplished by direct implementation of this widely known algorithm in digital hardware utilizing multiplication and arithmetic processing integrated circuits IDT7216L and IDT7381L from Integrated Device Technology, Inc., or equivalent along with standard logic and static RAM products that are widely available.

The order in which the code recognition process and the receive beamforming process are performed is interchangeable without effect on the concept. Practical considerations in the design of the signal processor determine this order. Beamforming in the receiver is sometimes described as channel formation or forming channels. The beams are described as parallel channels when, in fact, these channels are organized in the digital processing system using sequential and parallel methods which are functionally equivalent to parallel channels. Code channels are similarly produced by the digital processing. Forming a channel means that the signals are stored such that their amplitude is known as a sequence of numbers in memory and that they occur at the appropriate sampling rate to appropriately represent the signal waveform.

An image produced by this three dimensional beamformed television system appears to the human observer in many forms. The image data is available in computer memory as a three dimensional data array. This must be processed in the computer using a selected perspective angle and range. The data is integrated over the depth of interest and arranged according to the geometry dictated by the perspective. The data is available as complex numbers, as a result of the phase dependent processing, which are converted to magnitude. The display shows the magnitude at the appropriate pixel location as a gray level. Black is a level below the first increment threshold. White is the maximum. Logarithmic, linear, or other functions are used to optimize the range that can be seen. The scales can be inverted and color display systems can be used as options.

Continuing in reference to FIG. 9, the display processing 21 necessary to create a useful image is included. The television style of image requires processing to select a layer of interest. The thickness of this layer can be selected by the operator. A layer, as initially obtained, is from scattering points that lie along an elliptical surface. This arises from the separation of the transmitting and receiving array. This layer is entered in memory as constant range. The operator selects a particular range to observe and those data points are then displayed.

A complex visualization system is used to enable human perception of the three dimensional data. This will enable creation of images from arbitrary perspectives. Here the operator selects a layer thickness, a point in space, and a range from that point. The computer then calculates by projecting a vector from that point to select an appropriate pixel. The vectors are arranged to scan the data to form a visual like image. The presentation is by controlling the gray scale or brightness of the displayed pixel such that the scattering strength of the respective point is represented. Analysis type plotting can also be done, such as contour plots.

To display the velocity content of the three dimensional data involves a similar geometric process, but rather than the gray scale, a color coding method allows representation according to the data magnitude in each Doppler bin. This will lead to adjustment of display parameters, such that appropriate colors are chosen. Blended colors will occur where velocity is changing, either during one exposure or from successive exposures. Display persistence is one such parameter to adjust.

This data can be used in a variety of types of displays off line but the operational display is a visual format device 23 similar to a commercial television screen. This screen is also the computer screen.

The computer 13 controls all functions using software 14 with interfacing 24.

OTHER EMBODIMENTS

The more useful embodiments of this BEAMFORMED TELEVISION system method include other fields where visible light based imaging systems fail. There is no requirement as to wavelength, but special penetration advantages occur where the wavelength is substantially longer than visible light wavelengths. Implementation can be in very high frequency electromagnetic energy that is optical energy, though this is a more difficult technology to work with. Signal means of processing include optical processing.

In the longer wavelength applications, a number of other embodiments are natural applications of the invention. Where time allows, it is possible to utilize a degree of sequential scanning, rather than simultaneous beamforming, along with any of the other features of this invention.

Gated tone methods are easily integrated where simultaneous transmit beamforming is not required since the harmonics of the gating frequency do not then overlay a coding frequency band.

The three dimensional system, especially if it includes Doppler sensing capability, is simpler if applied for fixed position operation. With appropriate additional features the three dimensional beamformed television system is applicable to moving situations. For the system without Doppler sensing capability motion will cause uniform shift of the full set of transmit beams so that Doppler effects shift the image as a whole. Velocity errors shift the image up and down on the display screen. When the shift is excessive, an adjustment is made. A similar range shift will occur. For systems having Doppler sensing capability, the velocity measurements will be incorrect, though by a common offset error. Such errors can be removed by computer processing using software to recognize the error and insert corrections.

Another issue with moving systems, where large fractional bandwidth is used, is the non-linear velocity shifts that occur as a function of frequency. Here the simple linear function, that is represented by the stepped-chirp sequence, must be modified. Hyperbolic functions give improved correlation.

Fixed observation platforms underwater are a promising application. Such in-situ monitoring provides a stable base to avoid Doppler shift problems. Mobile underwater platforms, or vehicles, require appropriate motion measurement and compensation in the processing. Water motion will have some distorting effects on image quality which can be reduced by corrections applied in the signal processing computations.

In some applications it may be desirable to rearrange or modify the processes. For example, a modified system could utilize simultaneous transmission of the set of frequencies that were the steps of the stepped-chirp system. The simultaneous transmit beamforming could then become sequential. Instantaneous bandwidth requirements and need for time delay beamforming would be issues to consider. In such a system the bandwidth spread would have to be such that the sub bands did not overlap. It is possible to configure a coding system to do all the three dimensional operations as a result of a single burst transmission. This would be at the expense of reducing component signal levels since there would be a large number of such codes that would need to be combined without exceeding the limits of the linear extent of the transmitting equipment.

There are many possible variations on time delay or phase delay processing. Any process that adjusts relative timing of transducer signals to form beams will be useable. Any process that adjusts phase to accomplish this is useable, with care to not exceed bandwidth limitations. FFT methods are useable to adjust phase. There are a variety of other transforms that are useable to accomplish the beam formation effect.

Radar applications include equipment that would replace visible systems in fog conditions. Such applications would utilize antennas instead of the transducers used in acoustic systems. The system would be varied where the number of codes could be reduced because the requirement for complete image formation, as a result of a single burst of simultaneous signals, is relieved. A combination of simultaneous and sequential transmission would be appropriate in some applications such as radar where the speed of electromagnetic waves is so much greater than the speed of acoustic waves. In radar, or other applications where the bandwidth can be very wide, it is possible to condense the transmission time by transmitting all or some of the steps of the stepped-chirp simultaneously.

Wherever a system of frequency codes has been described, it is possible to use other coding methods. For these to work, they must enable determination of an equivalent of a phase and amplitude information content to the received signals such that that distance to the various scattering centers can be extracted by processing of signals.

Seismic prospecting may be particularly appropriate to the three dimensional imaging form of the present invention since this application involves long term stability which will enable long exposure times. Doppler capabilities would tend to be less important. Simultaneous beams would not be as important.

The basic system described as the preferred embodiment is a black and white system. Colors are useful in a visualization system to show the velocity image. Color can be used for the basic three dimensional spatial image entails a multiple band version of the spatial system. It involves more channels and, probably, parallel arrays but this could depend on technologies that may emerge. Where signal processing advances provide adequate processing speeds, the methods of three dimensional beamformed television can be applied to produce more imaging capability.

These applications and variations are all forms of three dimensional beamformed television.

Individual applications involve a system design process which includes basic skills in acoustic or electromagnetic fields with a substantial understanding of information theory and electronic signal processing methods. System design steps to accomplish the combination that is the full three dimensional, plus velocity, imaging system include:

1. Determine operating range from arrays to far side of region of examination including a buffer zone.
2. Determine angular field of view.
3. Select a general operating wavelength and determine length of both orthogonal arrays necessary to resolve angular dimensions.
4. Assess grating lobe situation and select transducers and make arrangement of transducers in the arrays to suppress grating lobes. Include effects of rails and aperture shading of individual transducers as well as individual transducer directivity.
5. Determine an allowable exposure time.
6. Determine the needed system depth of field.
7. Determine whether depth of field for a fixed focus system is adequate.
   a. Modify geometry of system.
   b. Use beam segment coding to give extended field of view.

8. Assess number of codes required in the sub band to code transmit beam segment system and Doppler bins and assess adequacy of individual code signals that can be used while remaining within the linearity limits.
9. Determine the time duration necessary to give adequate Doppler resolution and determine sub band width necessary to accommodate Doppler bins and transmit frequency codes.
10. Determine the number of range resolution cells needed to give desired range resolution over the system depth of field. Allow for range ambiguity effects, noting that range resolution begins at a zero round trip range point and continues as long as signal continues, but since the number of increments is limited there are repeated cells such that ambiguities exist. Hence, scattering from points outside the intended field of view can become clutter over the intended range. Allow a buffer zone for transitions by resolving beyond the desired field of view with earlier and later cells to be ignored.
11. Assess exposure time necessitated by the number of steps, or discrete frequency transmissions, that is equal to the number of range resolution cells determined above.
12. Determine overall stepped-chirp bandwidth from size of range resolution cell. Time resolution in seconds is the inverse of total stepped-chirp bandwidth in Hertz.
13. Determine that hardware for radiating and receiving signals and sampling responds over full system bandwidth on a sequential basis and responds to the sub band bandwidth on an instantaneous basis.
14. Determine gated-tone pulse frequency and duration and receiver on period timing such that the receiver is off during transmission and during times of reception from undesired ranges, that is, consistent with the limits and buffer zones of the stepped-chirp system. Allow for inexact transitions that arise from phase delay beamforming methods.
15. Check that gated-tone pulse frequency is greater than the sub band bandwidth that contains the simultaneous transmit beam segment system and Doppler system frequency codes.
16. Prepare software requirements for generating signals, controlling hardware processing, and transforming perspectives to produce display data. Include necessary signal sorting and concatenation to make effective pictures.
17. Assess resulting system and adjust configuration to satisfy needs of intended application.
18. Refer to documentation on Hewlett Packard 8510 Network Analyzer, Flam and Russel Co. documentation on radar cross section range instrumentation and Scientifice Atlanta Co. documentation on radar cross section gated c-w range instrumentation.

The knowledgeable system designer will modify these steps for simpler combinations or for other applications.

What is claimed is:

1. An imaging apparatus comprising:
   (a) a plurality of transmitting transducers in a transmitting array having a plurality of dimensions where said transmitting transducers simultaneously transmit radiated signals, and said radiated signals are radiated over a common field of view wherein objects modify said radiated signals to cause reflected signals, and
   (b) signal means of coding, phase adjusting, and distributing transmit signals that drive said transmitting transducers such that radiated signals form into a plurality of simultaneous, coded transmit beams that serve to identify transmit regions of said common field of view, by respective codes of said coded transmit beams passing through respective said transmit regions, and said coded transmit beams are simultaneously produced by a single burst transmission, where codes used are discrete frequency codes, and
   (c) a plurality of receiving transducers in a receiving array having a plurality of dimensions where said receiving transducers simultaneously sense said reflected signals, and thereby produce received signals, and
   (d) signal means of combining signals to form virtually simultaneous receive beam channels that are associated with respective receive regions, and signal means of processing signals to separate coded signals such that virtually simultaneous code channels are formed where said code channels are associated with respective said coded transmit beams, such that for a receive beam there is a plurality of said code channels, and
   (e) said transmitting array and said receiving array are relatively oriented to enable said transmit regions and said receive regions to determine location of said objects in two dimensions, and
   (f) signal means of frequency adjusting said transmit signals, and a sequence of operations such that said single burst transmission is repeated with said discrete frequency codes at successively different, respective, frequency values, and
   (g) signal means of performing transform operations to process signals resulting from said sequence of operations to form range increment channels that are associated with range increments, and
   (h) signal means of processing signals such that a combination of said range increments, said transmit regions, and said receive regions determine location of said objects in three dimensions, and
   (i) signal means of processing signals to form image signals.

2. An imaging apparatus according to claim 1 and configurations of transducers in said transmitting array and said receiving array to shape respective beamformed directional responses, wherein grating lobes are at angles that are determined by spacing of said transducers in respective arrays, and a beamformed directional response of said transmitting array serves to suppress system effects of grating lobes in a beamformed directional response of said receiving array and a beamformed directional response of said receiving array serves to suppress system effects of grating lobes in a beamformed directional response of said transmitting array.

3. An imaging apparatus according to claim 1 and a sparse distribution of elements in an array that causes grating lobe effects and said grating lobe effects are suppressed by a directional response of a different array.

4. An imaging apparatus according to claim 1 and an arrangement of transducers in an array such that grating lobes occur at predetermined angles, and rails, and said rails are attached to a different array, and said rails modify a directional response of said different array, and a relative orientation of arrays such that a system response effect of grating lobes is suppressed due to an effect of said rails.

5. An imaging apparatus according to claim 1 where an array is one element wide and an element of said array has a width that narrows a response of said element such as to cause significant suppression of grating lobe effects caused by a sparse distribution of elements in a different array.

6. An imaging apparatus according to claim 1 where a plurality of wide elements are laid out in a curved array, and width of said curved array is width of said wide elements.

7. An imaging system according to claim 1 where said transmit signals and said discrete frequency codes are spread apart in frequency to allow formation of additional code channels that are velocity channels, and radial velocity of scattering points in said field of view causes said velocity channels to respond, and said radial velocity of scattering points is determined by which velocity channel responds to a reflected signal, and said image signals represent said velocity channels to produce three dimensional velocity information.

8. An imaging system according to claim 1 with computational capability to form image signals that provide a view from a selected perspective.

9. An imaging system according to claim 1 with computational capability to form image signals that provide a view from a selected perspective, and said selected perspective is chosen by an operator.

10. An imaging system according to claim 1 with computational capability to form image signals that provide a view from a selected perspective, and said selected perspective is controlled by a computer.

11. An imaging apparatus according to claim 1 and capability to selectively view coarse range increments utilizing capabilities inherent to said codes, where said transmit signals continue for a transmit time duration, except that during said transmit time duration there are transmit signal interruptions where said transmit signals are caused to have zero amplitude, and said receiving transducers simultaneously receive signals for a receive time duration, except that during said receive time duration, there are receive signal interruptions where said receive signals are caused to be zero in amplitude, and a combination of said transmit signal interruptions and said receive signal interruptions serves to selectively prevent system response for a predetermined coarse range increment.

12. An imaging apparatus according to claim 1 and signal means such that said transmit signals continue for a transmit time duration, except that during said transmit time duration there are transmit signal interruptions where signals are caused to have zero amplitude, and said receiving transducers receive signals for a receive time duration, except that during said receive time duration there are receive signal interruptions where said receive signals are caused to be zero in amplitude, and a combination of said transmit signal interruptions and said receive signal interruptions serves to selectively prevent system response for transducer crossover coupling.

13. An imaging apparatus according to claim 1 and signal means such that said transmit signals continue for a transmit time duration, except that during said transmit time duration there are transmit signal interruptions where signals are caused to have zero amplitude, and said receiving transducers simultaneously receive signals for a receive time duration, except that during said receive time duration there are receive signal interruptions where said receive signals are caused to be zero in amplitude, and signals are held in consistent phase relationship to a continuous wave reference signal that operates over the transmit time duration, and processing that serves to selectively prevent system response for a predetermined range increment.

14. An imaging apparatus according to claim 1 and a barrier to control crossover coupling between said transmitting array and said receiving array.

15. An imaging apparatus according to claim 1 where coded transmit beam segments serve to identify range zones of said transmit regions of said common field of view by said respective codes of said coded transmit beam segments that focus within said range zones.

16. An imaging apparatus according to claim 1 and signal means to provide an extended depth of field capability where a plurality of said coded transmit beams are formed along a directional line and are focused over respective range zones, and for said directional line there are said range increment channels that overlap, and signal means to select from said range increment channels to utilize focused said coded transmit beams in formation of said image signals.

17. An imaging apparatus according to claim 1 where coded transmit beam segments serve to identify range zones of said common field of view by respective codes and said coded transmit beam segments focus within said range zones at predetermined angles, and a combination of said range zones and predetermined angles enables focus of said radiated signals for an expected scene.

18. An imaging apparatus according to claim 1 with signal means to allow for Doppler effect so as to compensate for motion of a selected collection of scattering centers in a scene such that only said selected collection of scattering centers is viewed.

19. An imaging apparatus according to claim 1 and apparatus to couple acoustic energy to subject of examination.

20. An imaging apparatus according to claim 1 and a panel to control grating lobe effects where operation is in proximity to a reflecting surface.

21. An imaging apparatus according to claim 1 and aperture tapering of individual transducers to shape a directional response of said individual transducers to provide suppression of effects of grating lobes in overall system response.

22. An imaging apparatus according to claim 1 and an attachment to individual transducers of transitional material between said individual transducer and a medium of propagation, where shape of said transitional material affects directional response effects of said individual transducer.

23. An imaging apparatus according to claim 1 and an attachment plate overlaid on an array of transducers having openings to allow energy coupling through a passage way to a medium of propagation, where shape of said passage way affects directional response effects of an individual transducer.

24. An imaging apparatus according to claim 1 and signal means to recognize an occurrence of high signal level condition of said transmit signals and to adjust said transmit signals to reduce clutter caused by said high signal level condition.

25. An imaging apparatus according to claim 1 and apparatus to couple acoustic energy to subject of examination.

26. A system comprising equipment according to claim 1 and means to operate underwater.

27. A system comprising equipment according to claim 1 and means to guide surgical instruments based on said image signals.

28. A system comprising equipment according to claim 1 and means to operate so as to penetrate the ground.

29. A system comprising equipment according to claim 1 and signal means to produce visible images that enable vision in fog conditions.

30. A sensing system comprising:
 (a) a plurality of transmitting transducers in a transmitting array having a plurality of dimensions where said transmitting transducers simultaneously transmit radiated signals, and said radiated signals are radiated over a common field of view wherein objects modify said radiated signals to cause reflected signals, and (b) signal means of coding, phase adjusting, and distributing transmit signals that drive said transmitting transducers such that radiated signals form into transmit beams and transmit beams pass through respective said transmit regions, and (c) a plurality of receiving transducers in a receiving array having a plurality of dimensions where said receiving transducers simultaneously sense said reflected signals, and thereby produce received signals, and (d) signal means of combining signals to form receive beam channels that are associated with respective receive regions, and (e) said transmitting array and said receiving array are relatively oriented to enable said transmit regions and said receive regions to determine location of said objects in two dimensions, and (f) signal means of frequency adjusting said transmit signals, and a sequence of operations such that said transmit signals are repeated at successively different frequency values, and (g) signal means of performing transform operations to process signals resulting from said sequence of operations to form range increment channels that are associated with range increments, and (h) an efficient distribution of elements in an array that causes grating lobe effects, and said grating lobe effects are suppressed by directional effects of a different array, and (i) signal means of processing signals such that a combination of said range increments, said transmit regions, and said receive regions determines location of said objects in three dimensions, and (j) signal means of processing signals to form sensing signals.

31. A sensing system according to claim 30 where said receive beam channels are virtually simultaneous receive beam channels.

32. A sensing system according to claim 30 and a beam segment coding system where said transmit beams are coded, and a code recognition process that enables formation of code channels that are associated with respective said transmit beams.

33. A sensing system according to claim 30 where an array is one element wide and an element of said array has a width that narrows a response of said element such as to cause significant suppression of grating lobe effects caused by another array.

34. A sensing system according to claim 30 with computational capability to form image signals to provide a view from a selected perspective.

35. A sensing system according to claim 30 with computational capability to form image signals that provide a view from a selected perspective, and said selected perspective is chosen by an operator.

36. A sensing system according to claim 30 with computational capability to form image signals that provide a view from a selected perspective, and said selected perspective is controlled by a computer.

37. A sensing system according to claim 30 and capability to selectively view range increments utilizing capabilities inherent to said codes, where said transmit signals continue for a transmit time duration, except that during said transmit time duration there are transmit signal interruptions where said transmit signals are caused to have zero amplitude, and said receiving transducers simultaneously receive signals for a receive time duration, except that during said receive time duration, there are receive signal interruptions where said receive signals are caused to be zero in amplitude, and a combination of said transmit signal interruptions and said receive signal interruptions serves to selectively prevent system response for a predetermined range increment.

38. A sensing system according to claim 30 and signal means such that said transmit signals continue for a transmit time duration, except that during said transmit time duration there are transmit signal interruptions where signals are caused to have zero amplitude, and said receiving transducers receive signals for a receive time duration, except that during said receive time duration there are receive signal interruptions where said receive signals are caused to be zero in amplitude, and a combination of said transmit signal interruptions and said receive signal interruptions serves to selectively prevent system response for transducer crossover coupling.

39. A sensing system according to claim 30 and signal means such that said transmit signals continue for a transmit time duration, except that during said transmit time duration there are transmit signal interruptions where signals are caused to have zero amplitude, and said receiving transducers simultaneously receive signals for a receive time duration, except that during said receive time duration there are receive signal interruptions where said receive signals are caused to be zero in amplitude, and signals are held in consistent phase relationship to a continuous wave reference signal that operates over the transmit time duration, and processing that serves to selectively prevent system response for a predetermined range increment.

40. A sensing system according to claim 30 and a barrier to control crossover coupling between said transmitting array and said receiving array.

41. A sensing system according to claim 30 with signal means to allow for Doppler effect so as to compensate for motion of a selected collection of scattering centers in a scene such that only said selected collection of scattering centers is viewed.

42. A sensing system according to claim 30 and apparatus to couple acoustic energy to subject of examination.

43. A sensing system according to claim 30 and a panel to control grating lobe effects where operation is in proximity to a reflecting surface.

44. A sensing system according to claim 30 and an attachment to individual transducers of transitional material between said individual transducer and a medium of propagation, where shape of said transitional material affects directional response effects of said individual transducer.

45. A sensing system according to claim 30 and an attachment plate overlaid on an array of transducers having openings to allow energy coupling through a passage way to a medium of propagation, where shape of said passage way affects directional response effects of an individual transducer.

46. A sensing system according to claim 30 and apparatus to couple acoustic energy to subject of examination.

47. A system comprising equipment according to claim 30 and means to guide surgical instruments based on said image signals.

48. A system comprising equipment according to claim 30 and means to operate so as to penetrate the ground.

49. A system according to claim 30 and a beam segment coding system where a field of view includes a plurality of regions wherein there are focused transmit signals, and a plurality of transmit signal codes, and signals simultaneously pass through said regions, and a code recognition process that identifies said regions are identified by respective codes.

50. A sensing system according to claim 30 where said different frequency values are continuing signals of continuously varying frequency.

* * * * *